United States Patent [19]

Borst

[11] 4,165,289

[45] Aug. 21, 1979

[54] SYSTEM FOR THE CLARIFICATION OF WASTE WATER AND UTILIZATION OF WASTE PRODUCTS

[76] Inventor: Adolf H. Borst, Schloss Ramsberg, 7322 Donzdorf, Fed. Rep. of Germany

[21] Appl. No.: 824,148

[22] Filed: Aug. 12, 1977

Related U.S. Application Data

[63] Continuation-in-part of Ser. No. 753,402, Dec. 22, 1976.

[30] Foreign Application Priority Data

| Dec. 23, 1975 [DE] | Fed. Rep. of Germany | 2558703 |
| Jan. 22, 1976 [DE] | Fed. Rep. of Germany | 2602306 |
| Feb. 18, 1976 [DE] | Fed. Rep. of Germany | 2606451 |
| Feb. 18, 1976 [DE] | Fed. Rep. of Germany | 2606452 |

[51] Int. Cl.² .................. C02C 1/18; C02C 5/02
[52] U.S. Cl. .................. 210/27; 210/33; 210/40; 210/68; 210/71; 210/73 S
[58] Field of Search .................. 210/27, 30 R, 33, 39, 210/40, 47, 66, 67, 71, 73 R, 73 S, 80, 82, 184, 269, 270, 271, 274, 284, 332, 68

[56] References Cited

U.S. PATENT DOCUMENTS

| 1,937,481 | 11/1933 | Raisch et al. | 210/67 |
| 3,171,801 | 3/1965 | Rice et al. | 210/80 |
| 3,655,046 | 4/1972 | Trussell | 210/73 S |
| 3,741,890 | 6/1973 | Smith et al. | 210/73 S |
| 3,783,128 | 1/1974 | Thompson | 210/27 |
| 3,998,731 | 12/1976 | Franzen et al. | 210/33 |

*Primary Examiner*—Robert H. Spitzer
*Assistant Examiner*—Ivars Cintins
*Attorney, Agent, or Firm*—Townsend and Townsend

[57] ABSTRACT

A solid and liquid waste disposal and treatment plant, and a method for operating the plant is described. Solid waste received in the plant is incinerated in one or more rotary drums disposed in a closed furnace chamber. The solid waste incineration takes place under an oxygen deficiency to liberate heat energy and generate a combustible gas. A pyrolyzation or carbonization drum is also disposed in the furnace chamber and heated with the liberated heat energy. Organic matter, primarily organic sewage sludge is placed into the pyrolyzation drum and carbonized to produce coal. The coal is placed into a two-stage coal filter for the filtration of incoming sewage. The second stage of the coal filter utilizes coal activated within the plant for the removal of both particulate and dissolved contaminants so that the effluent from the filter comprises usable water. The combustible gas is cracked in a cracking unit to form short chain hydrocarbons and the gas is utilized in an internal or external combustion engine, a furnace or liquefied for subsequent use. Hot exhaust gases generated in the furnace and in the combustion engine are cooled by directing it through suitable heat exchangers or over wet solid waste or wet, sludge saturated filter coal to dry them while cooling the exhaust gas and to further cleanse the exhaust gas of pollutants for its discharge to the atmosphere. Sludge saturated filter coal is regenerated in the furnace by carbonizing organic sludge adhering to the filter coal or it may be incinerated with solid waste.

23 Claims, 17 Drawing Figures

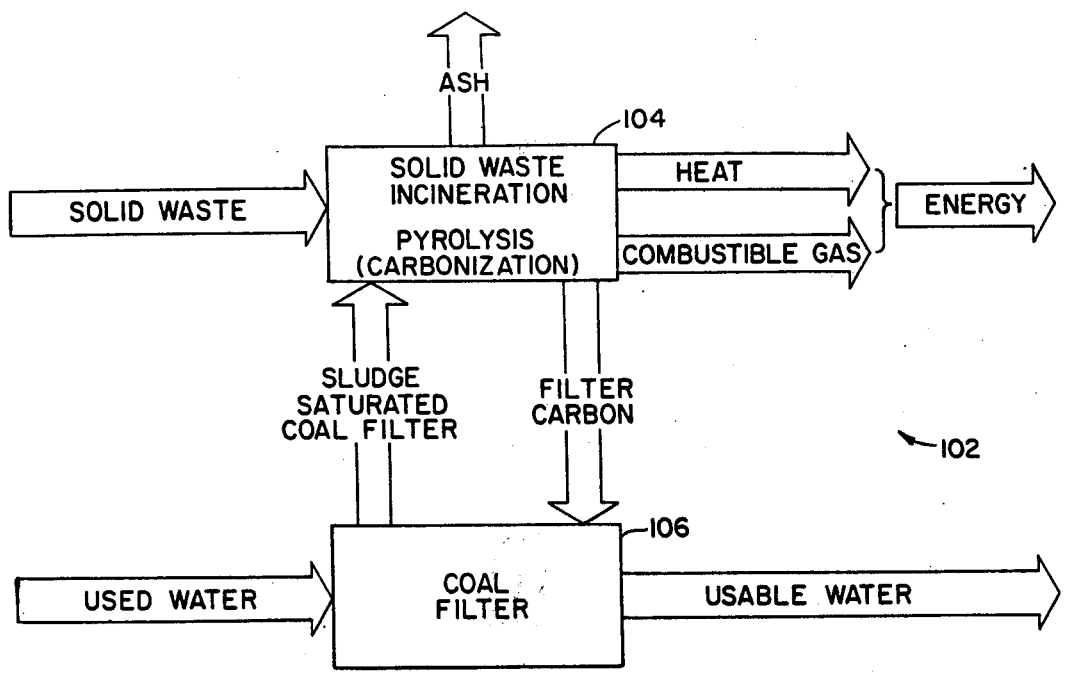
FIG.—1.
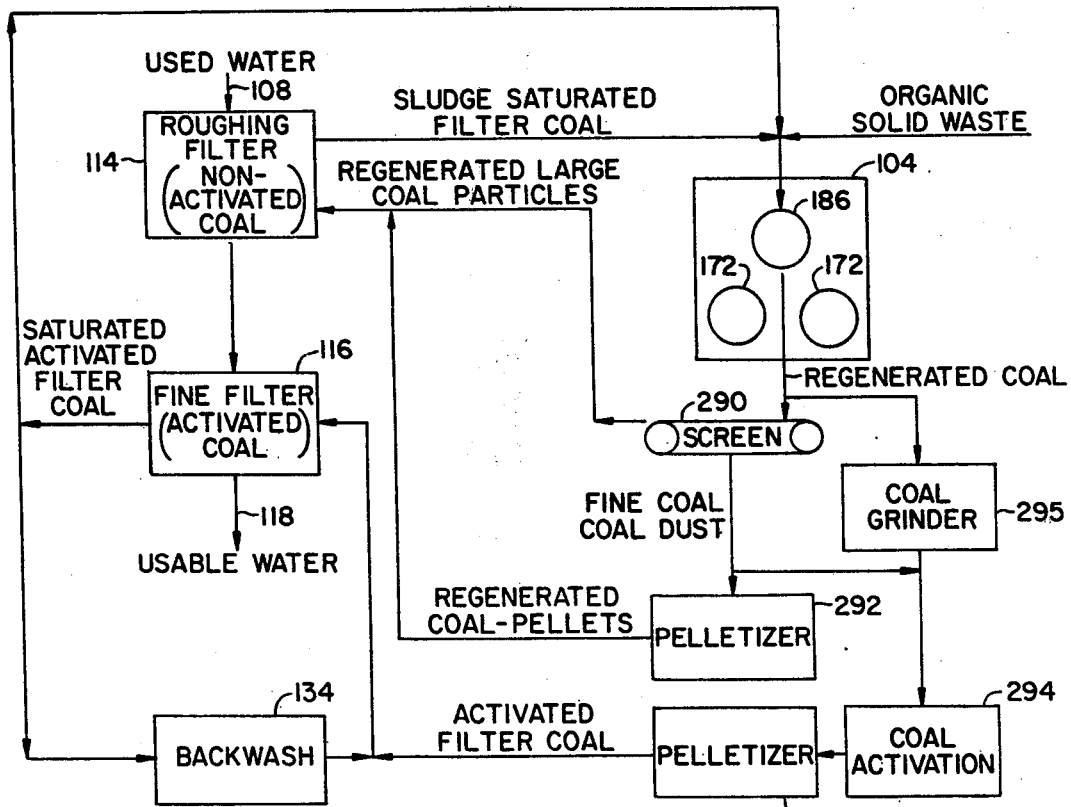
FIG.—3.

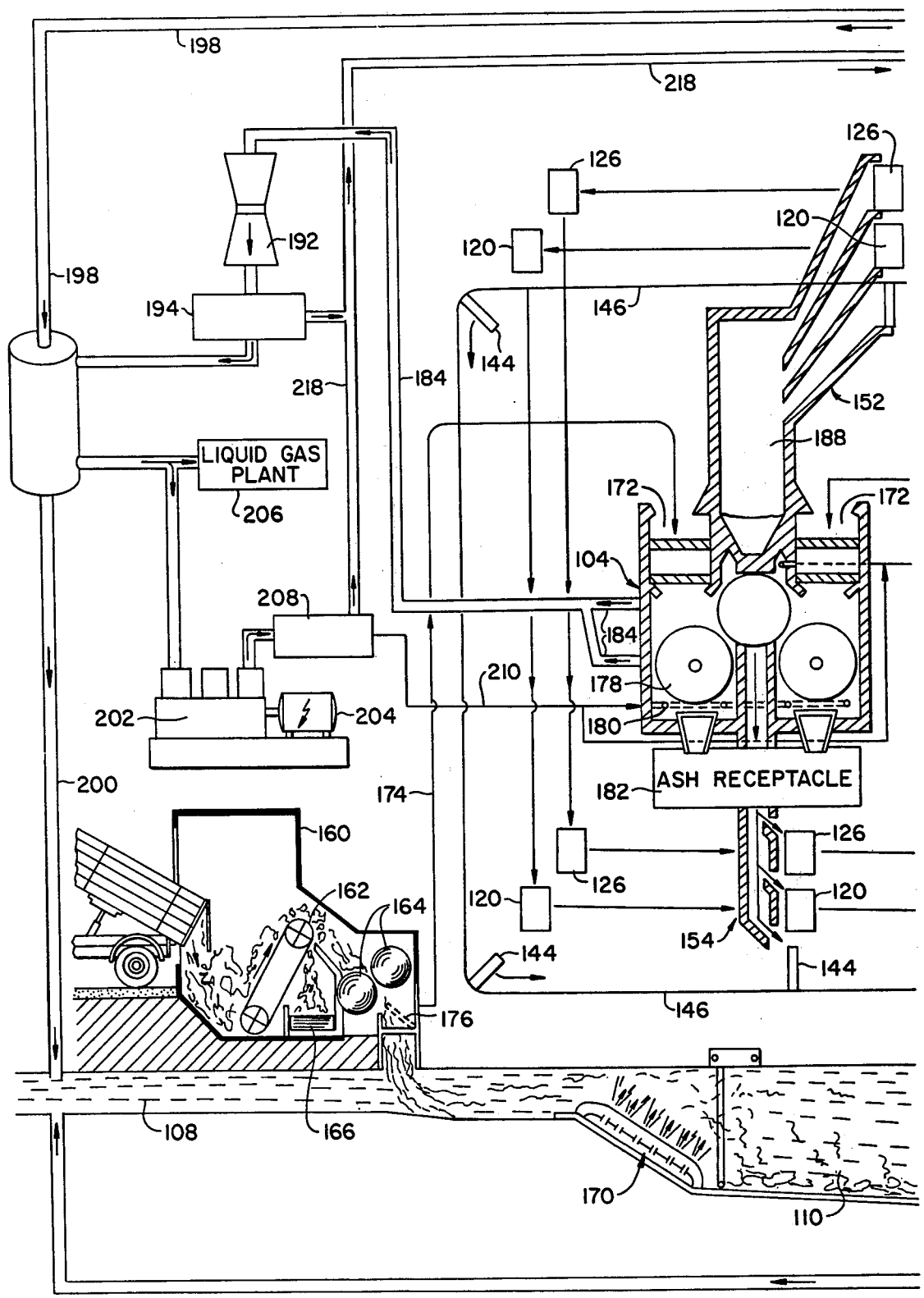
FIG._2a.

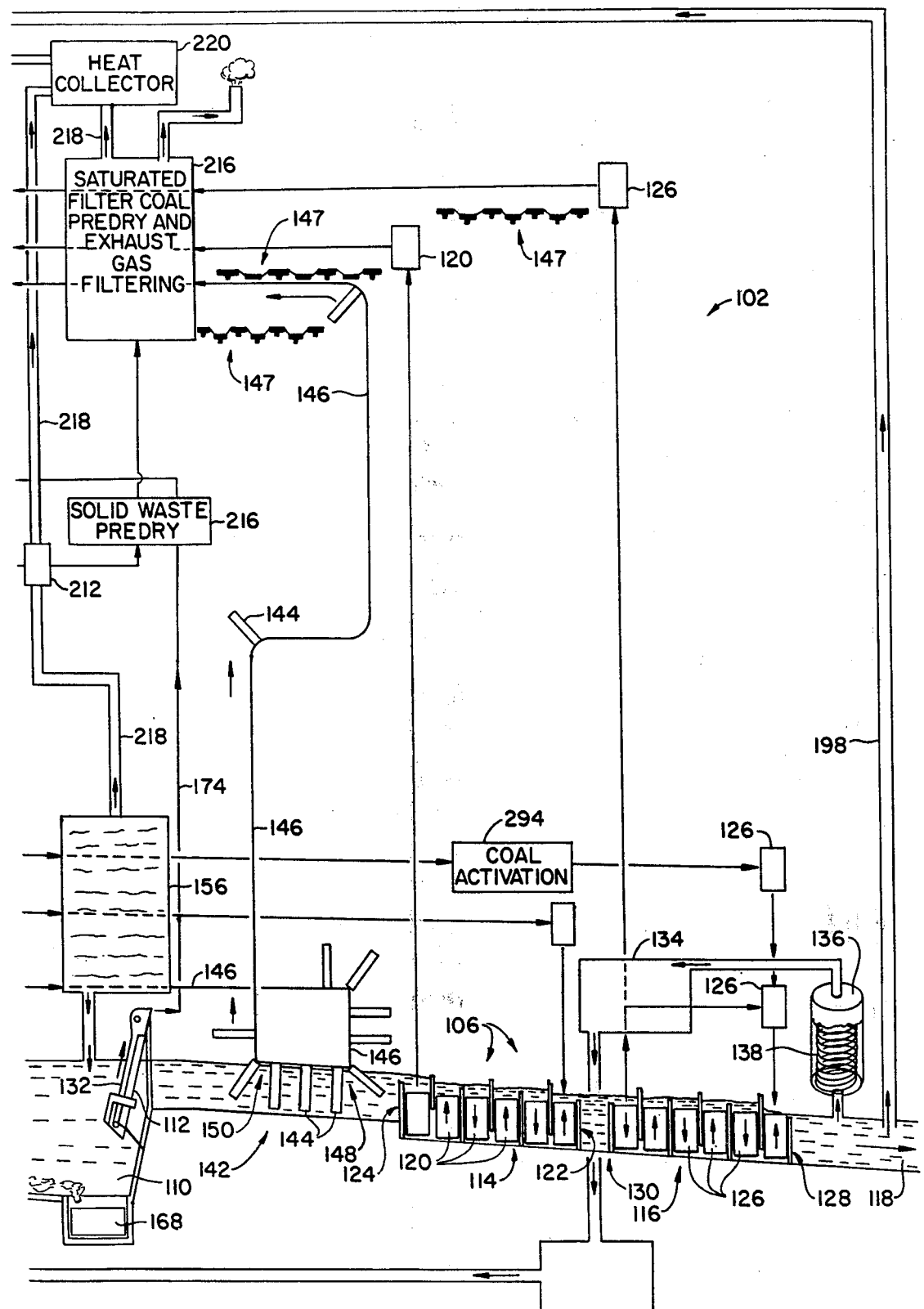
FIG._2b.

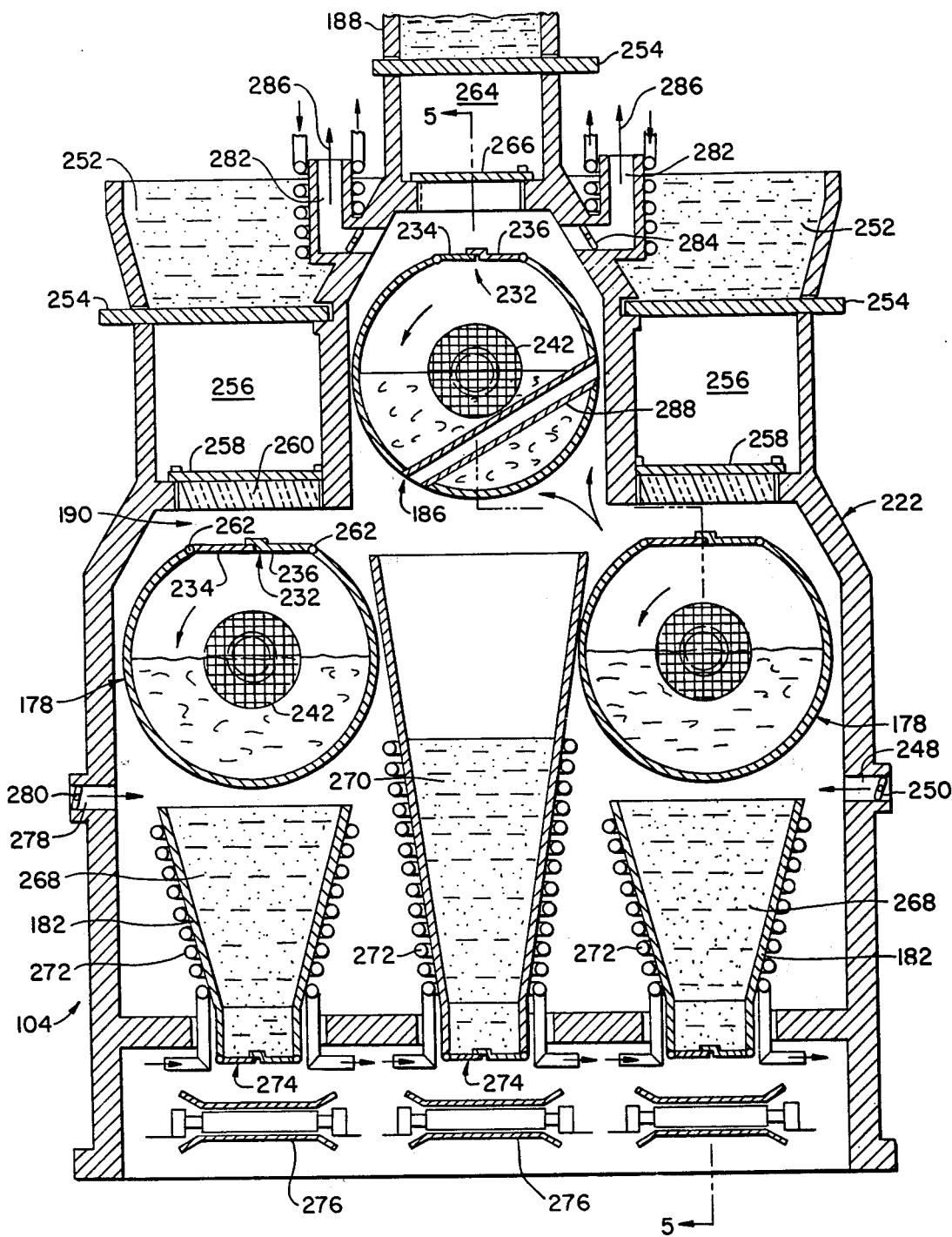
FIG._4.

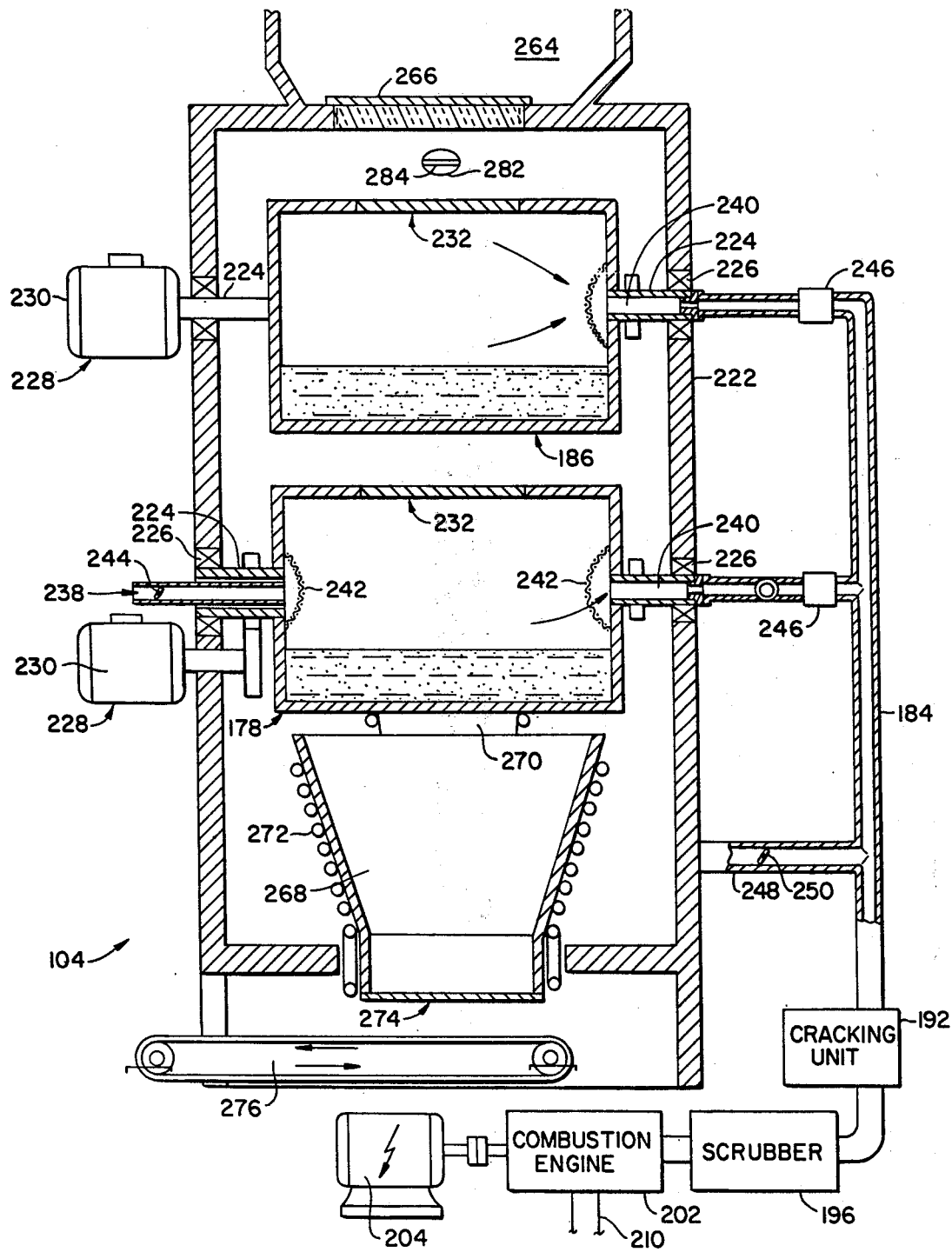
FIG._5.

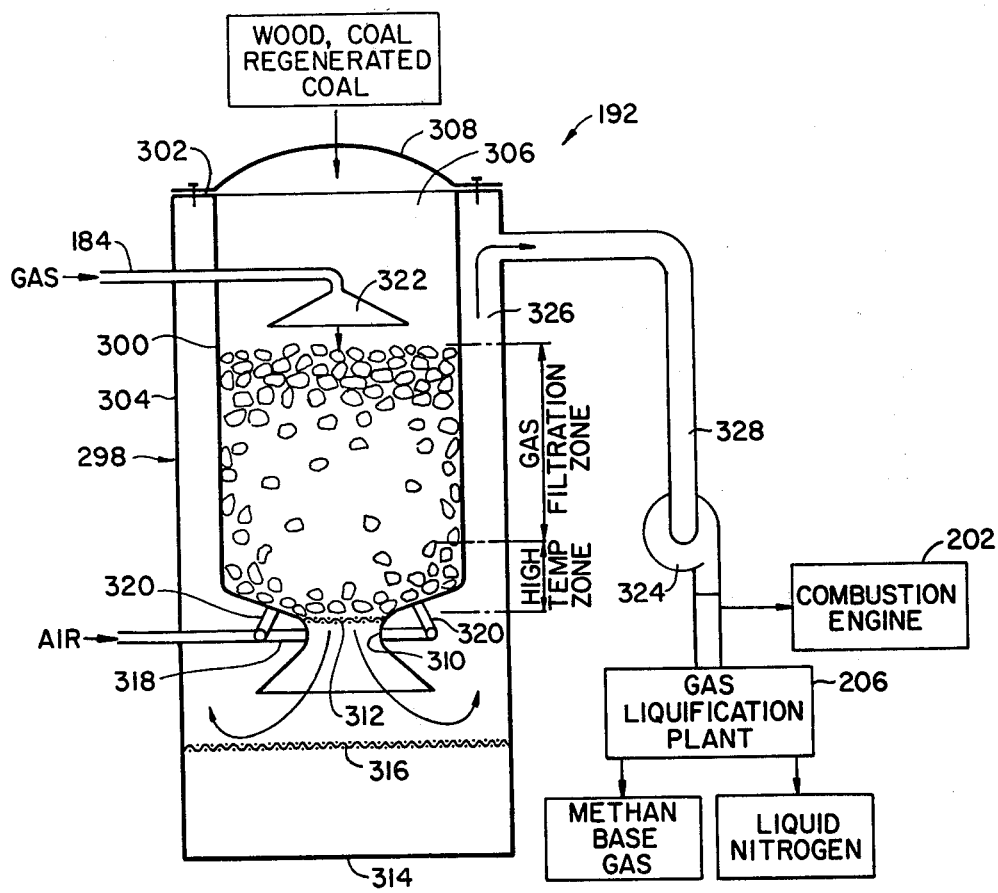
FIG._6.
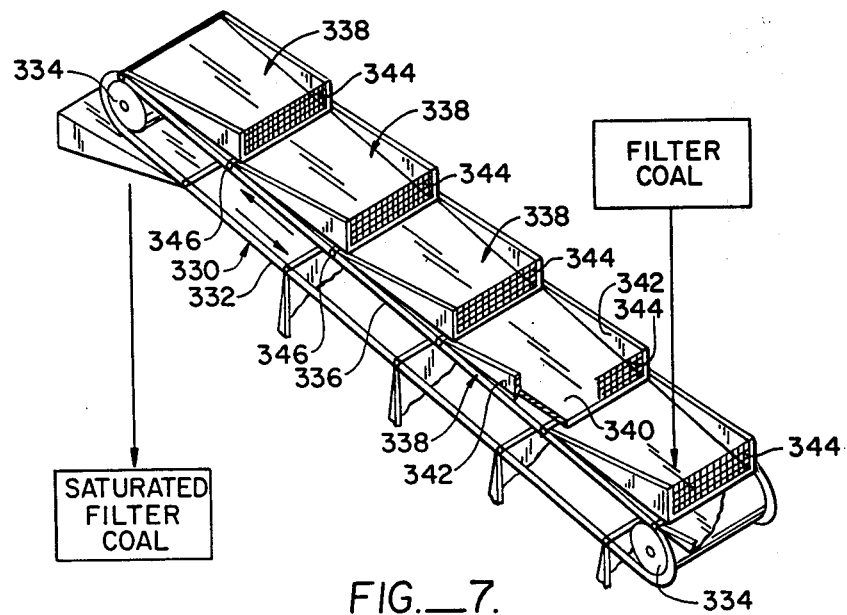
FIG._7.

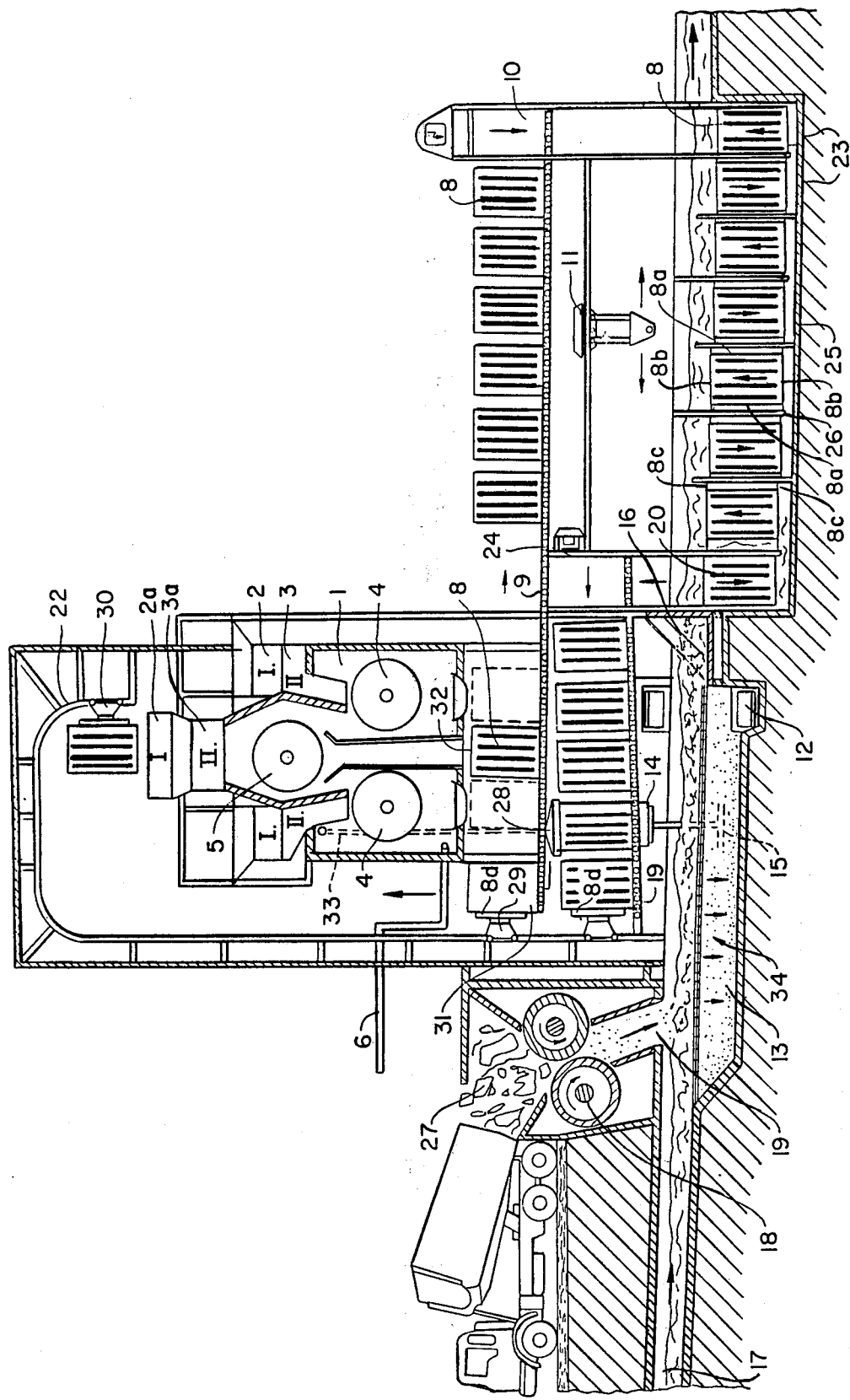
FIG._8.

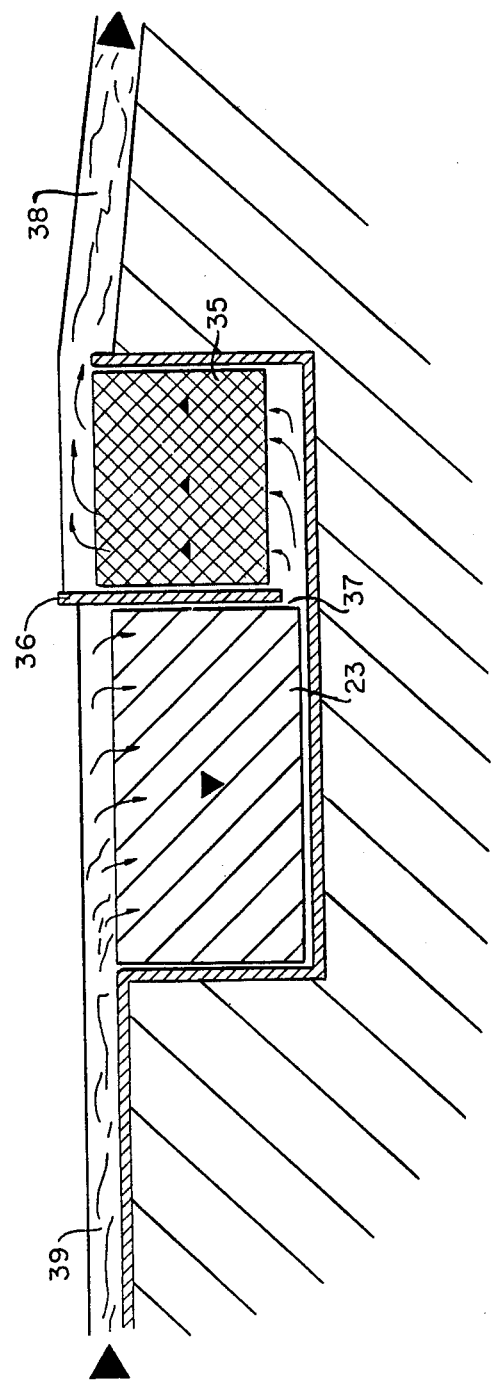
FIG._9.

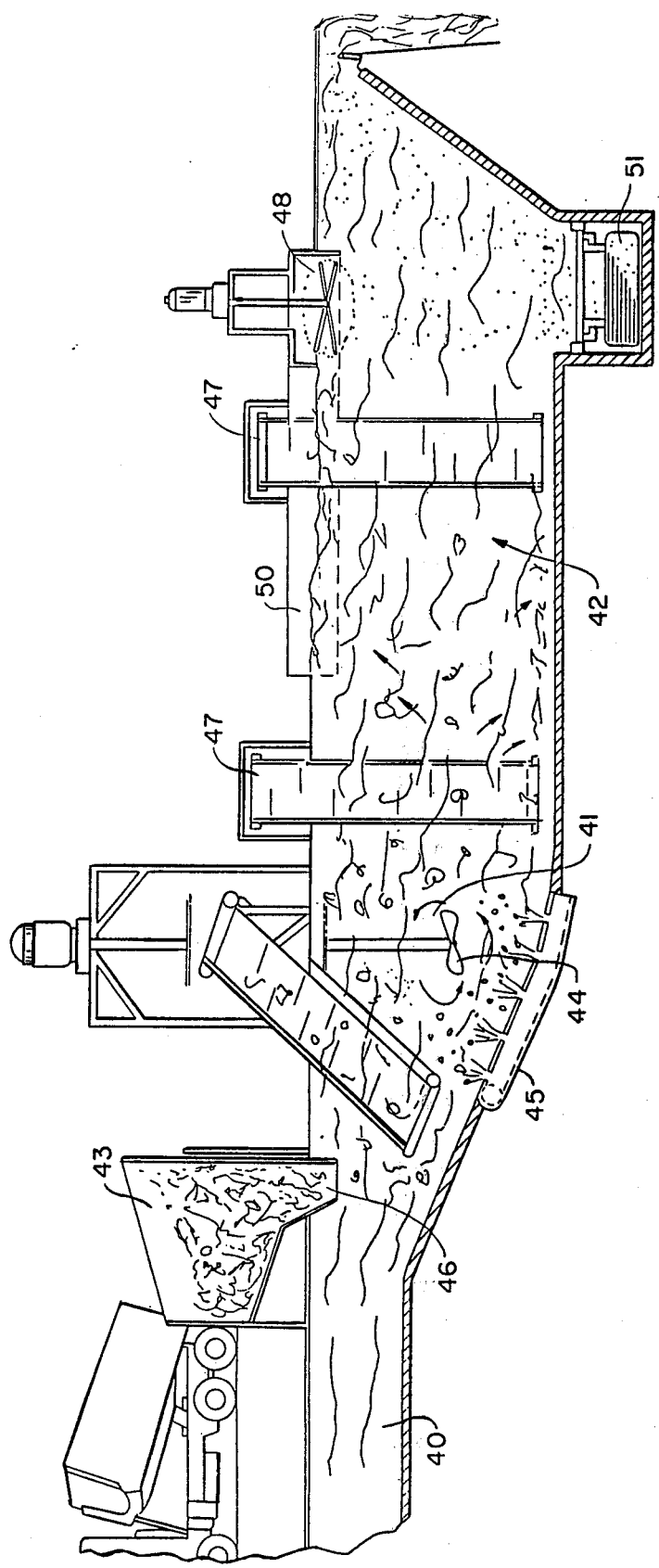
FIG._10.

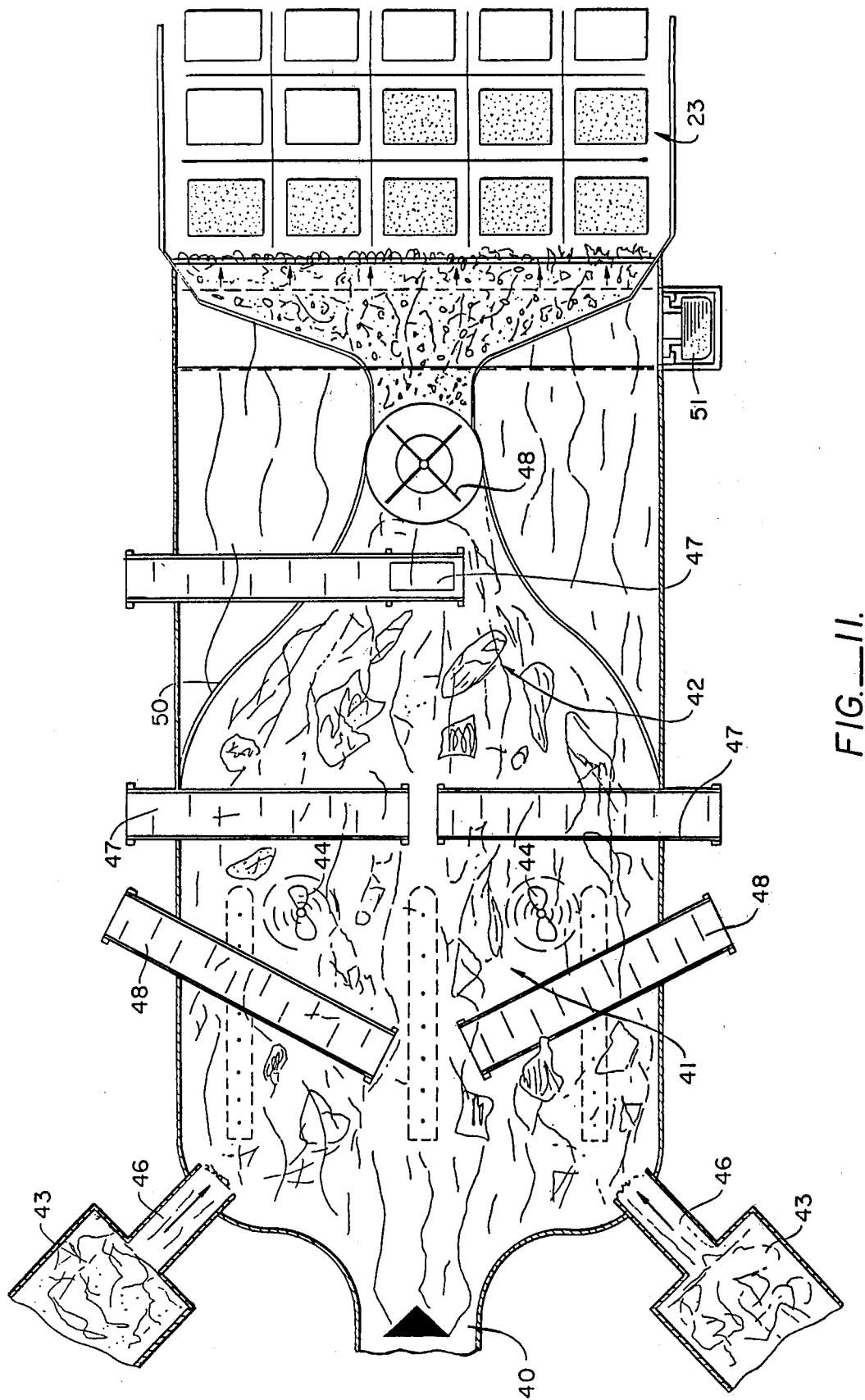
FIG._11.

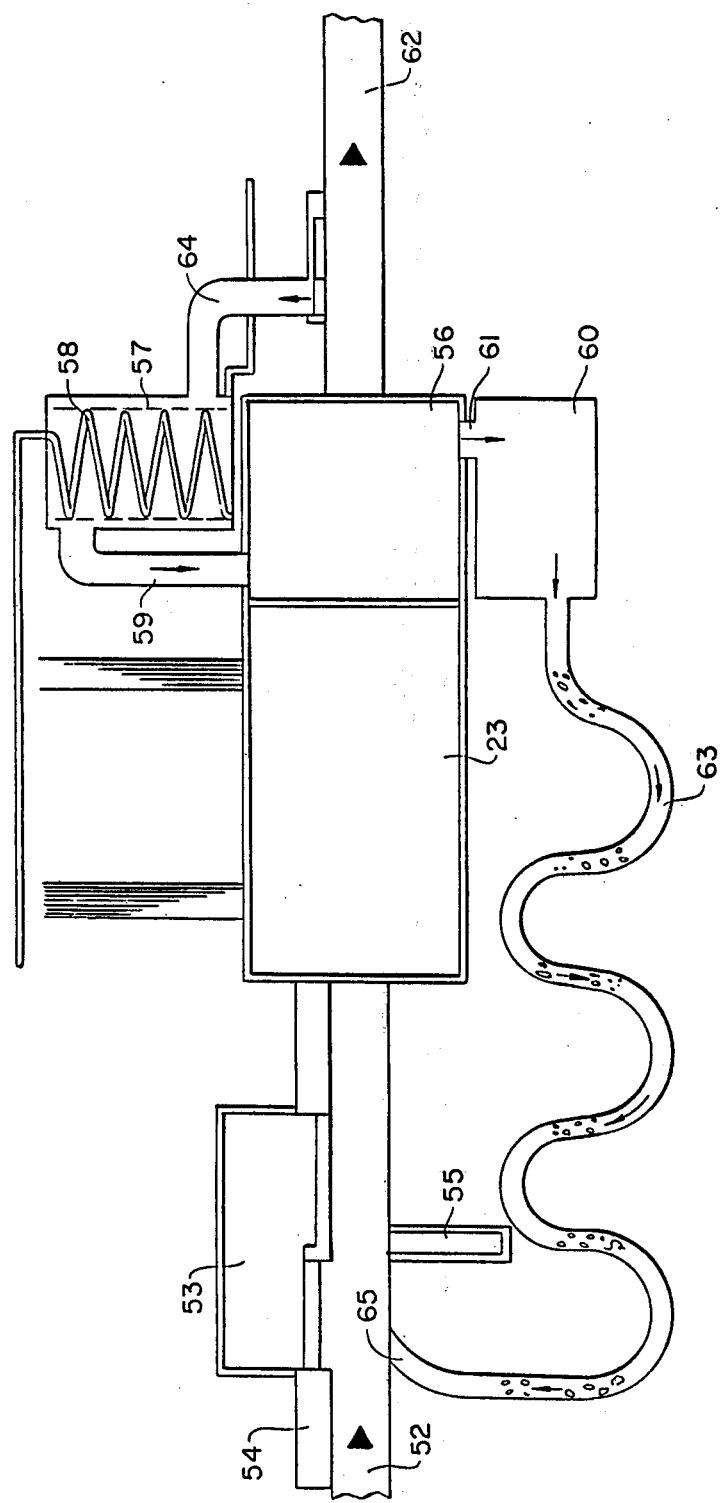
FIG._12.

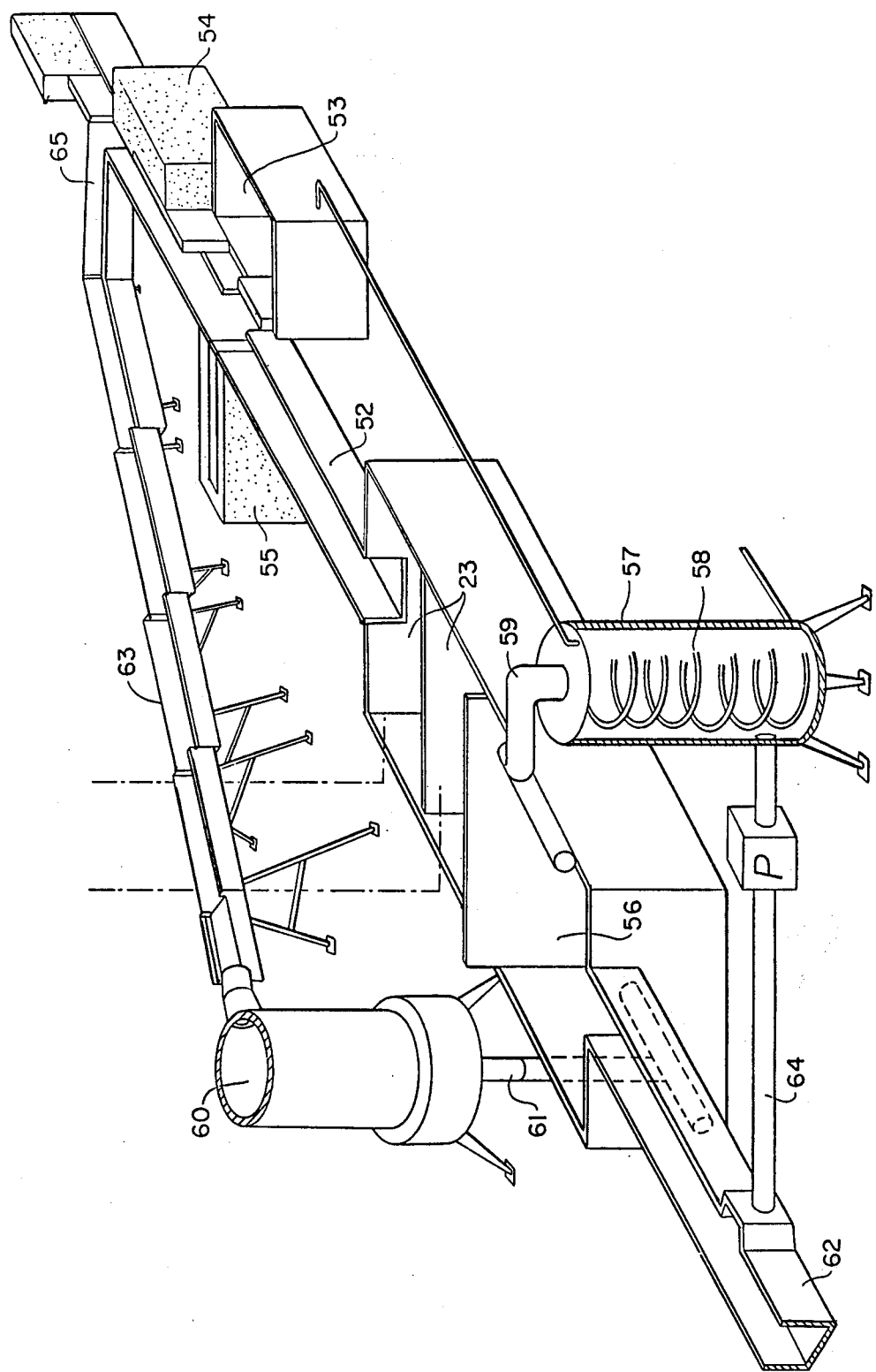
FIG._13.

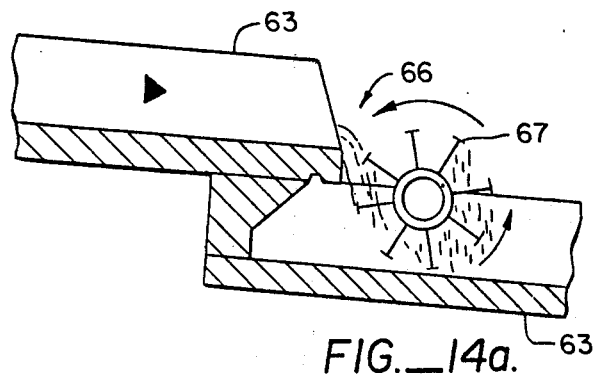
FIG._14a.
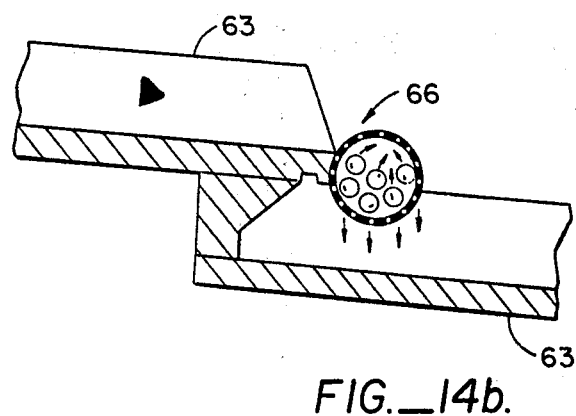
FIG._14b.
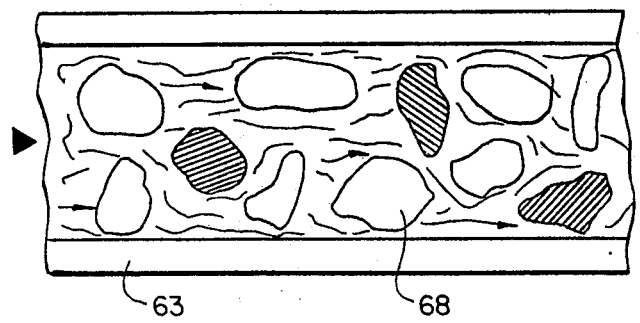
FIG._14c.

SYSTEM FOR THE CLARIFICATION OF WASTE WATER AND UTILIZATION OF WASTE PRODUCTS

RELATED APPLICATIONS

This application is a continuation-in-part application of the inventor's co-pending patent application bearing Ser. No. 753,402, filed Dec. 22, 1976 for COMBINED WASTE WATER CLARIFICATION AND TRASH DISPOSAL SYSTEM.

BACKGROUND OF THE INVENTION

One of today's foremost problems is the disposal of domestic, agricultural and industrial wastes, the protection of the environment to limit air and water pollution to non-damaging levels, and the need to accomplish these goals in an economic manner. It is fair to say that presently this goal has not been reached. As a result, municipalities face almost insurmountable solid waste disposal problems and both the inland and oceanic waters are becoming increasingly polluted, particularly in the vicinity of population centers or concentrations of industry.

The heretofore common practice of dumping solid wastes or using it as landfill becomes less and less feasible as suitable sites are exhausted. Moreover, dumping of solid waste requires extensive land transportation and is therefore costly. As an alternative to dumping it has been proposed to incinerate solid waste. Although solid waste incineration reduces the volume of the waste to be disposed of, it has serious shortcomings. First of all, its operation is normally uneconomical. In addition, it leads to serious air pollution unless the exhaust gases from the incinerator are cleaned by washing them in water. This in turn pollutes the increasingly scarce water. Moreover, solid waste incineration poses serious health hazards because heavy metals in the waste are vaporized. The vapors escape with the exhaust gases and pollute the atmosphere with dangerous heavy metal fumes.

While the solid waste disposal represents to a large extent an economic problem, water pollution, the disposal of sewage and an assured, adequate water supply for domestic, agricultural and industrial use pose an even more serious problem. Aside from economic considerations, the total water supply is limited and not replenishable; that is, water can neither be fabricated nor can the overall supply be increased. The available fresh water supply in any geographic region and worldwide is limited to that available from natural precipitation, the runoff therefrom, and available ground water supplies.

In almost all instances, once water has been used, it becomes polluted water (hereinafter sometimes referred to as "used water") which can no longer be effectively used and which pollutes clean water if it comes in contact therewith. Thus, it is necessary to treat used water at least to such an extent that it no longer harms the water, say sea or river water, into which it is discharged. Preferably, however, used water is cleaned to a sufficient extent to render it again usable.

In the past, it has become a widespread practice to clarify waste waters through an initial, more or less effective preclarification in a biologically activated zone of a clarification plant to reduce the pollutant content of the water. The clarification zones are thought to remove from the water dissolved and suspended organic and inorganic materials in a separation or flocculation process which forms a sludge that can be separated from the water, normally through sedimentation. It employs chemical precipitation agents which are to cause ameliorization, that is, which are to render dissolved substances hydrophobic.

It has been established that this process effects a considerable clarification of the water so long as the microorganisms of the biologically active zone are not subjected to dangerous toxic substances. The clarification efficiency of the process decreases rapidly when heavy metal contaminations, say from industrial waste, or toxic substances from dissolved agricultural fertilizers and pesticides, etc. are encountered because these contaminants damage the micro-organisms and reduce their activity and effectiveness.

Assuming that the micro-organism attacking contamination levels in the waste water can be kept to tolerable levels, the prior art water clarification processes generally withdraw sludge which normally has a particle or solid content of about 3%. The sludge is then dehydrated in a number of somewhat cumbersome steps, first by concentrating the sludge (which yields highly polluted waste water that is returned to the clarification plant) and thereafter by passing the concentrated sludge through a filter press or a centrifuge where a particle concentration of up to 30 to 40% is achieved. The concentrated sludge can then be disposed at suitable disposal sites. However, since such sites are becoming increasingly scarce, the sludge is frequently incinerated in accordance with a variety of processes.

For example, the sludge may be combined with previously generated ash in the energy inefficient, so-called sludge-ash incineration method which requires substantial amounts of external energy, e.g. fuel to effect the incineration of the sludge removed from the waste water and which recyles and, therefore, reheats a relatively large volume of ash.

More recently, it has been proposed to incinerate sludge from sewage treatment or water clarification plants in a sludge-pyrolysis process in which the sludge is heated in an oxygen deficient atmosphere to generate a combustible pyrolysis gas. The gas can in turn be used as a heat source for the sludge pyrolysis or it can be otherwise profitly used, e.g. for firing a boiler or driving a gas powered motor.

The system described in the preceding paragraphs has shortcomings such as the fact that it normally requires the input of external energy due to the presence of relatively large amounts of water in the sludge and that the quality of the treated water is no better than that obtained in the sedimentation basin of the plant. Fine particles as well as many dissolved substances remain in the water so that the effluent is at best a water that has a somewhat lesser pollution level than the original waste water fed to the clarification plant. Although it is possible to further treat the water before it is discharged from the plant by means of sand filters and the like, the very high water volume and the difficulty in maintaining the filters unclogged have made such approaches in the past technologically as well as economically unfeasible. To thoroughly clean the water and render it reusable, as by filtering it with activated carbon, has heretofore been impossible because of the prohibitively high costs of activated carbon. Sand filters, on the other hand, represent difficult or impossible cleaning and/or disposal problems, particularly when large quantities of water must be treated as is the case in municipal sewage treatment plants, for example.

Thus, as a result of the above summarized shortcomings in solid and liquid waste disposal systems and techniques, each is performed separately in a generally unsatisfactory manner and the problems connected with each increase continuously while pollution, particularly water pollution becomes more and more serious. Unless the trend is reversed, the day on which widespread water shortages are commonplace is not too far in the distance.

SUMMARY OF THE INVENTION

The present invention is directed to an overall system to comprehensively treat and dispose of both solid and liquid waste, the latter normally in the form of domestic, agricultural or industrial sewage, without causing air pollution or polluting waterways, the oceans and the like. This is performed in an economical, self-sustaining manner in which the waste materials become a valuable energy source rather than an undesirable waste product.

Although the present invention has numerous aspects, some of the most important ones can be summarized at the outset. First of all, the invention combines in an economic and technically feasible manner the disposal of solid waste and the treatment and clarification of used waters such as municipal sewage, industrial and agricultural waste waters and the like. According to this aspect of the invention, solid waste is incinerated in an ecologically and economically sound manner to provide a source of energy for the disposal of waste and pollutants (hereinafter sometimes "sludge") removed from used water so that the combined solid waste-used water treatment process not only becomes energy self-sufficient but yields additional energy over and above that needed in the processes. In fact, by virtue of the present invention the treatment and disposal of solid waste and used water becomes economically self-sustaining and yields profits so that the whole waste disposal treatment process constitutes a sound business enterprise.

Another aspect of the present invention relates to the manner in which the solid waste and sludge are incinerated. The incineration takes place at relatively low temperatures, normally in the range of between about 600°–800° C., although at times temperatures as low as 300°–400° C. might be employed, so that the evaporation of heavy metals is avoided. A resultant air and/or water pollution by heavy metals residue is thereby prevented. Instead, the heavy metals collect in the remaining ash and they can be safely disposed or they can be reclaimed therefrom.

Furthermore, the incineration process takes place in a controlled, oxygen deficient atmosphere to generate both heat and combustible gas. The latter is drawn off and can be subsequently used as an additional external energy source for the incineration processes or as a fuel for a separate boiler, a combustion engine or the like. The drawn off combustible gas can be further treated in a cracking unit to break long chain hydrocarbons into short chain hydrocarbons, which in turn can be directly utilized in internal combustion engines, turbines and the like.

Another, most important aspect of the present invention is the fact that a portion of the recovered organic materials is transformed into carbon in a pyrolytic process (hereinafter "pyrolysis"). The carbon can further be activated and it can be utilized as a low cost filter material for used water to yield reusable water, fit for either industrial and agricultural use or to yield potable water provided the filter is properly constructed. This is in direct contrast to prior art practice in which filter carbon and particularly activated filter carbon had to be purchased at very high costs and thereby became disqualified as an economically feasible filter material. With that the many advantages derived from coal filters, not the least of which is the fact that organic materials adhering to coal filters can again be incinerated in a pyrolysis process to replenish carbon.

A yet further aspect of the present invention relates to the cleansing and full utilization of exhaust gases from the incineration processes and/or the above-referenced heat engines. These gases are passed through suitable heat exchangers to withdraw from them as much heat energy as possible, or they are used to predry wet waste and/or filter materials prior to their incineration or regeneration, and they are scrubbed before they are released to the atmosphere by directing the gases through usable water or, preferably through incoming used water to remove particulate contaminants therefrom. Since the used water is already contaminated and since it will be treated and cleansed before it is discharged, the cleansing of the exhaust gases causes no pollution, it just slightly increases the contaminant load of the incoming used water. Yet, the gases that are ultimately discharged to the atmosphere are clean and non-polluting. Furthermore, energy that is normally discharged into the atmosphere with hot exhaust gases is recovered and can be profitably used.

From this brief introduction, it will be apparent that the solid waste-used water treatment and disposal system and processes of the present invention enable one to economically treat and dispose of both solid waste and liquid waste such as municipal sewage, industrial waste and the like. Furthermore, this is done in an ecologically sound manner. The residue from the system is a relatively small volume of generally inert, easily disposed, e.g. buried ash, reusable water, and clean exhaust gases which do not pollute or otherwise damage the atmosphere. The process further continuously yields energy in the form of heated, combustible gases which can be suitably utilized. As a result, the process and system of the present invention make the disposal of solid and liquid waste a profitable proposition which no longer strains municipal and industrial budgets and which, in fact, makes the disposal of these materials fully self-supporting. As a consequence thereof, the increasingly bleak disposal prospects of the past, in technological, ecological and economic terms are turned into attractive business opportunities of today.

In more specific terms, the system and process of the present invention is best envisioned as a parallel and interrelated process flow of solid and liquid wastes. The solid waste stream, e.g. municipal garbage which includes all commonly found solid wastes such as food wastes, paper, plastic materials, oil and tar residues, old tires, wood, glass, ash and the like, is initially brought into the treatment plant. Non-combustible materials such as metals, glass, rocks, sand and the like are first removed from the solid waste to the greatest possible extent by, for example, passing the waste over suitable classifiers and/or immersing the waste in water so that the heavier inorganic substances settle out and can be removed while the lighter organic substances float or are suspended and can be skimmed off the top or removed from the water with suitably constructed screens or the like. For the removal of ferrous materials, magnets are preferably employed.

The organic solid waste from which as much inorganic matter as possible has been removed is next fed to an incinerator where the waste is combusted to generate heat. Preferably, the combustion process is performed in an oxygen deficient atmosphere. The organic waste may be fully combusted, to leave only ash, or it may be pyrolysed so as to yield as an end product carbon and combustible gas.

The gas from the solid waste incineration process is withdrawn, passed through the above-discussed cracking unit and it can then be utilized as an energy source in a boiler, internal or external combustion engine, it may be piped to a user, or it may be liquefied for storage. Normally, however, the gas will be finally combusted so that the released energy can be utilized. Thereafter, the gas is cleansed as more fully discussed below and discharged to the atmosphere.

Ash generated during the solid waste incineration process is suitably collected and disposed of, e.g. buried at a suitable site. Usable inorganic components in the ash such as heavy metals may be recovered before the ash is disposed.

The used water stream that requires treatment, i.e. clarification continuously flows into a receiving tank of the plant. This tank may simultaneously serve as a solid waste receiving and classifying tank in which the inorganic solid waste can settle out and can be removed before the solid organic waste is incinerated. After the removal of all rough organic and inorganic matter from the incoming used water, it is directed to a first roughing filter for the removal of substantially all suspended particles in the water. Although the roughing filter may be of any kind, it is preferred to construct it as a coal or carbon filter which is stocked with carbon generated during the pyrolysis of solid organic wastes. The effluent from the roughing filter is a relatively clean water from which substantially all suspended particles have been removed. The removal of these particles is, of course, enhanced by the provision of multiple, serially arranged filter elements. In accordance with one aspect of the present invention, these filter elements are counter-rotated relative to the water flow.

After a filter element has been saturated with filtered out matter, it is removed from the water flow, preferably predried with heated gas, such as with the available exhaust gas just prior to its discharge to the atmosphere, and thereafter it is regenerated by placing the filter coal and particulate matter adhering thereto in a suitably constructed incinerator. The filter coal and materials adhering thereto may be completely incinerated as above-described to yield ash, heat and a combustible gas, or they may be pyrolyzed so that organic matter adhering to the filter coal is carbonized. Filter coal lost during the regeneration step and during the mechanical handling of the filter can thus be continuously replaced with coal generated from the filtered out organic materials. At the end of the incineration and/or the pyrolysis, the filter coal is removed from the incinerator, used to restock a filter element and recycled through the roughing filter.

The effluent from the roughing filter continues through a fine filter, preferably also constructed of a plurality of serially arranged filter elements which are stocked with activated carbon so that particulate matter which was able to pass through the roughing filter as well as contaminants dissolved in the effluent from the roughing filter are removed therefrom. The result is that the effluent from the fine filter is clean, reusable water of a quality at least sufficient for industrial use. By properly constructing the fine filter the water quality can be enhanced so that the water becomes drinkable.

The fine filter elements are again periodically replaced, they may be regenerated by carbonizing organic matter adhering to the activated filter coal, or the activated filter coal and adhering contaminants, including especially heavy metals may be incinerated at a sufficiently low temperature to prevent the vaporizing and discharge into the atmosphere of heavy metals vapors. Thus, such filter elements are preferably incinerated together with the solid waste received in the plant.

An intricate part of the present invention is the incinerator for the solid waste and for the regeneration of the filter coal. In accordance with the present invention, such a filter is preferably constructed in the form of multiple, parallel, externally heated rotary drums or kilns.

Generally speaking, the incinerator of the present invention comprises a furnace which defines an enclosed chamber. At least two, vertically spaced apart rotary drums are disposed within the chamber. Preferably, there are three drums within the chamber, the axes of which are triangularly spaced apart so as to define a pair of parallel, spaced apart lower drums and a parallel upper drum, the axis of which overlies the space between the two lower drums.

The lower drums serve as incinerators for solid waste. Fresh solid waste is periodically placed into the lower drums via suitable filling mechanisms and openings and the drums are at least initially externally heated so as to raise the temperature in the lower drums sufficiently to initiate combustion. The oxygen content in the drums is controlled, preferably so that the incineration in the lower drums generates sufficient heat to sustain itself but so that the average temperature in the drums does not exceed the stated range of 500° to 800° C. As a consequence thereof, combustible exhaust gas is generated which is continuously withdrawn from the drums.

The upper drum of the incinerator is positioned so that heat generated in the lower drums rises by convection and heats the exterior of the upper drum to the desired temperature. The upper drum is periodically stocked with filter coal from filter elements saturated with filtered out matter, e.g. sludge. In the drum the filter coal is initially dried and organic substances adhering thereto are pyrolyzed to yield carbon and additional combustible exhaust gas that is withdrawn and combined with the exhaust gas from the lower drums.

After the solid waste in the lower drums has been incinerated, the ash, which may still contain small quantities of organic matters which cannot be efficiently combusted, is periodically withdrawn. Preferably this is done by momentarily arresting the rotation of the drums, opening suitable hatches in the drum, and downwardly discharging the ash into receptacles, onto conveyors or the like. Similarly, upon the completion of the pyrolysis of the organic matter adhering to the filter carbon in the upper drum, its rotation is briefly arrested and the carbon therein is discharged into suitable receptacles or onto conveyors or the like. Thereafter, the drums are restocked with the respective materials and the process is repeated.

The just described incinerator of the present invention thus incinerates and pyrolyzes solid wastes and filter sludge from the combined solid waste-liquid waste treatment plant of the present invention in one and the same incinerator. Solid waste, which normally has a lesser water content and a substantially greater heat value than sludge is incinerated and the heat given up thereby is directly applied to the sludge to dry the sludge and the filter carbon to which it adheres and to pyrolyze it. Thus, the present invention employs heat liberated during the incineration of solid waste, which was previously to a large extent discharged to the atmosphere and thereby lost, on a continuing basis to dry out and pyrolyze filter sludge. In other words, the drying of the filter sludge, which heretofore posed such great and costly problems, can be performed in a most economic manner with no significant energy costs when combined with the incineration of solid waste as above-described.

Moreover, the solid waste incineration and filter carbon regeneration/pyrolization can be readily controlled to prevent local overheating,(and the resulting evaporation of heavy metals, for example) by constructing the furnace chamber for the drums so that fresh or cooling air can be supplied if excess heat is generated or, conversely, so that some of the combustible exhaust gas generated in the incinerator can be recycled into the chamber to furnish any additional heat that may be necessary to maintain the process.

The coal or carbon that is regenerated in the uppermost drum can be directly used in the filter elements for the above-discussed roughing filter. It can also be activated, however, for use in the fine filter. For coal activation the uppermost drum may be constructed and operated in the manner described in applicant's copending patent application bearing Ser. No. 768,922, filed Feb. 15, 1977 or the coal may be transported to a coal activation drum or container in which non-activated coal is heated in an inert atmosphere and activated, either with chemical agents or with steam, in a well-known manner.

Other more specific features of the present invention relate to specifics of the construction of the various sections of the treatment plant, specific refinements in the process steps and the like more fully discussed below. The more important features include a variety of alternative constructions for the filters which employs a plurality of counter-rotating filter elements; details of the construction of the combustible exhaust gas cracking unit and a particularly advantageous manner of operating and backwashing the fine filter stocked with activated carbon.

This last mentioned aspect of the present invention eliminates the need to completely regenerate or replace the activated carbon filter elements each time they must be cleansed and thus prolongs their service life and enhances their operating efficiency. The adsorption of water contaminants by the activated carbon filter normally requires relatively low operating temperatures. The desorption of the same materials from the activated carbon filter (to cleanse the filter) is best performed at elevated temperatures because such temperatures provide the particles to be desorped with greater kinetic energy. To enable the "hot backwashing" of the activated carbon filter, a backwash water reservoir is heated with exhaust gases available in the plant. Heating coils or the like are placed in a backwash water reservoir and the hot exhaust gases are passed through the coil. Thermal energy from the gas is thereby transmitted to the water, warming the water and correspondingly cooling the exhaust gas. When it is time to backwash the fine filter the used water filtering process is temporarily interrupted and the backwash water is counterflowed through the activated carbon filter to desorp, i.e. to remove therefrom particles filtered from the used water. After the completion of the backwash process the backwash water is preferably placed in a second reservoir where it is cooled. Thereafter it is returned to the waste water intake of the treatment plant for filtering and ultimate discharge from the plant as clean, reusable water. Alternatively clogged filter elements can be withdrawn from the filter and placed in a separate backwashing tank to eliminate the need for interrupting the filtering operation. Of course, it is necessary to replace the withdrawn element with a fresh, e.g. already backwashed element.

From the foregoing summary of the present invention it should now be apparent that its chief benefits are derived from a combination of a variety of independently known processes in one and the same plant, the controlled incineration of organic waste, and the internal generation of carbon and activated carbon to support the water filtering. All this is done in an energy efficient manner in which not only the energy required by the various processes is internally generated from the waste products received in the plant but in which substantial amounts of additional energy are generated so that the plant is economically self-supporting and yields a profit. While the input into the plant is the heretofore so troublesome waste, both solid and liquid, the output are ecologically undamaging exhaust gases, relatively small volumes of inert and readily disposed of ash, clean, reusable water and excess energy. In other words, the present invention accomplishes that which up to now presented an almost insurmountable problem.

BRIEF DESCRIPTION OF THE DRAWINGS

FIG. 1 is a schematic flow diagram which illustrates the material flow for treating and disposing solid and liquid waste in accordance with the present invention;

FIGS. 2A and 2B are a schematic overall flow diagram for a solid and liquid waste treatment and disposal plant constructed in accordance with the present invention;

FIG. 3 is a schematic flow diagram which illustrates in greater detail the manner in which normal and activated filter coal is manufactured, used and regenerated in accordance with the present invention;

FIG. 4 is a front elevation, in section, and illustrates the solid waste-sludge incineration and pyrolyzation furnace of the present invention;

FIG. 5 is a side elevation, in section, of the furnace shown in FIG. 4 and is taken along line 5—5 of FIG. 4;

FIG. 6 is a schematic diagram of a cracking unit constructed in accordance with the invention;

FIG. 7 is a detailed perspective, side elevational view of a cool filter constructed in accordance with the invention;

FIG. 8 schematically illustrates portions of a water purification plant constructed in accordance with another embodiment of the present invention and shows a single filter bed only;

FIG. 9 schematically illustrates in cross-section the provision of a first, roughing filter bed of non-activated carbon followed by a second, fine filter bed of activated carbon located downstream of the first filter bed;

FIG. 10 is a schematic side elevational view of a portion of a clarification plant constructed in accordance with another embodiment of the present invention and illustrates a manner in which trash and waste waters are combined and organic substances are separated from inorganic substances;

FIG. 11 is a plan view of the clarification plant portion illustrated in FIG. 10;

FIG. 12 is a schematic plan view of a backwash system constructed in accordance with the present invention for backwashing activated carbon filters.

FIG. 13 is a schematic perspective view of the backwash system shown in FIG. 12; and FIGS. 14 (a)-(c) are fragmentary side elevational views, in section, of the construction of the used backwash water return conduit.

DESCRIPTION OF THE PREFERRED EMBODIMENTS

Referring first to FIG. 1, the material flow in a solid and liquid waste treatment and disposal plant 102 constructed in accordance with the present invention is schematically illustrated. The plant includes a furnace 104, the detailed construction of which is more fully described below which is stocked with solid waste received by the plant. The solid is preferably pretreated, especially classified so that it comprises essentially only organic matter. In the furnace, the solid waste is incinerated, preferably under an oxygen deficiency to generate heat and a combustible gas as is graphically illustrated by the arrows extending to the right of the furnace. Ash from the incineration of the solid waste is periodically withdrawn from the furnace and suitably discarded.

Used water such as municipal sewage or industrial waste waters are also sent to the plant 102. A multistage, coal filter 106, the detailed construction of which is more fully described below, clarifies and treats the used water so that the filter effluent is usable water of a quality at least sufficient for industrial use. The coal filter is preferably a two-stage filter having a roughing filter and a fine filter (not separately shown in FIG. 1). The fine filter is intermittently backwashed to maintain its capacity while the coal of the roughing filter and particulate matter or sludge adhering thereto periodically regenerated in furnace 104.

Coal regeneration is performed in furnace 104 by intermittently withdrawing saturated filter elements (not separately shown in FIG. 1) from the filter and pyrolyzing the coal and in particular the sludge ahdering thereto so as to generate additional coal that can be used for filtering. Coal losses experienced in the process are there thereby compensated for.

Referring now to FIG. 2, the overall construction and operation of the waste disposal and treatment plant 102 is described in greater detail. A used water intake channel 108 flows used water or sewage in a downstream direction, that is to the right as viewed in FIG. 2, past a settling basin 110 and a screen 112 towards a roughing filter 114. A fine filter 116 is disposed downstream of the roughing filter for the final clarification and treatment of the water before its discharge as usable water through exit channel 118.

The roughing filter 114 is defined by a plurality of roughing filter elements 120 which can be inserted and withdrawn from the filter by vertically lowering or raising them therefrom as is schematically illustrated in FIG. 2. Each filter element is stocked with normal filter coal of the appropriate particle size and in operation the filter elements are periodically moved in a counterflow direction from a downstream end 122 of the filter to an upstream end 124 thereof by suitably lifting the elements from the filter and replacing them in the next upstream filter compartment. The filter element at the upstream end of the filter is removed for cleansing and regeneration as it is further described below.

Similarly, a fine filter 116 is defined by a plurality of fine filter elements 126 which are preferably also periodically moved in a counterflow direction from a downstream end 128 of the fine filter to an upstream end 130 thereof. The filter element at the upstream end is periodically removed from the filter for cleansing, preferably by backwashing.

The used water cleansing process of the present invention can now be briefly summarized. The incoming water moves relatively slowly through the settling basin 110 so that relatively heavy inorganic substances such as sand, pebbles and the like entrained in the water flow can settle to the bottom of the basin. Large floating or suspended, primarily organic matter is caught by the screen 112 and removed from the water flow by an upwardly inclined conveyor 132 that is suitably constructed to permit the relatively unimpeded passage of water past it while it grasps and conveys upwardly out of the basin all large objects caught by the screen.

Used water passing the conveyor is relatively free of large size particulate contaminants but may be heavily contaminated with small size, suspended particulate, usually organic matter as well as dissolved contaminants.

The roughing filter elements 120 are each stocked with normal, that is non-activated, pelletized coal or carbon of the appropriate particle size and it removes from the water flow substantially all suspended matter. Its effluent, therefore, is water that is effectively free of particulate contaminants except for very small particles but which still includes suspended contaminants. These contaminants are removed by the fine filter elements 126 which are stocked with activated carbon to yield a final effluent which comprises usable water.

Referring briefly to the lower righthand portion of FIG. 2, fine filter elements 126 can be backwashed and thereby cleansed by providing a suitably constructed backwash compartment 134 disposed in the vicinity, e.g. above the upstream end 130 of the fine filter. Suitable hoisting equipment (not separately shown) moves the filter element 126 at the upstream filter end into the backwash compartment when the filter element has been saturated with particulate matter and sludge. While all remaining filter elements are stepwise moved in an upstream direction towards the next, upstream filter element position the just removed, filter element is backwashed in compartment 134 by flowing clean and preferably heated water through the filter element in a counterflow direction relative to the normal filter water flow therethrough. Preferably the backwash water is taken directly from the usable water channel 118 and it may be temporarily stored in a reservoir 136 fitted with heating coils 138 which receive heat energy from furnace 104 as is further described below. Used backwash water is flowed through a return conduit 140 to used water intake 108 for recirculation through and filtration by filters 114, 116. After completion of the backwash operation the cleansed fine filter element 126 is ready for resinsertion in fine filter 116 to repeat the just described filter replacement cycle. Alternatively, the saturated filter element may be circulated through furnace 104 for the regeneration of the filter sludge or its incineration as is further discussed below.

As a further alternative to the individual filter backwashing process the backwash method described below may be employed.

When very heavy contamination loads are encountered a prefiltered 142 may be positioned between screen 112 and roughing filter 114. The prefilter is also stocked with normal coal that is periodically regenerated in the above-described manner. In one preferred embodiment of the invention, filter elements 144 of the prefilter may be mounted to a slowly or intermittently moving chain conveyor 146 or the like which transports the filter element in the direction of the arrows in FIG. 2 into the used water flow at a downstream end 148 of the prefilter and then in a counterflow direction to the used water to an upstream end 150 where the now saturated filter elements are withdrawn from the water flow in an upward direction. An advantage of this construction of the filter is that the stay time of the filter elements in the water flow is readily adjusted to the encountered contamination level by correspondingly increasing or decreasing the speed of conveyor chain 146. It is, of course, apparent that a like filter element and filter element conveyor construction can be employed in either or both of the roughing filter 114 and the fine filter 116.

The filter elements 144 of the prefilter generally comprise a suitable frame which holds the coal particles or pellets during transport of the elements and while they perform their filtration function. After the removal of the elements from the water flow, conveyor chain 146 transports the saturated filter elements to a coal or carbon intake chute 152 of furnace 104 for the regeneration of the carbon and the pyrolyzation of the sludge adhering to the coal. A drip dryer 147 for filter elements is preferably provided for removing as much water as possible from the filter coal before its regeneration and/or incineration. The drip dryer may include a shaking mechanism (not shown) to aid in the water removal.

The now empty filter element continue past the chute to beneath furnace 104, as is schematically illustrated in FIG. 2, for the restocking of the elements with freshly regenerated coal at a coal discharge chute 154 of the furnace. From there the filter elements, filled with fresh filter coal are transported back to prefilter 142. A heat collector 156 may be interposed between coal discharge chute 154 and the prefilter for cooling the hot reconstituted coal and transferring the heat of the coal via a suitably constructed heat exchanger (not separately shown) to a heat transport medium, e.g. water flowing in a hot water collector pipe 218 as is further described below.

Still referring to FIG. 2, solid waste is received in a bin 160 where an initial classification of the waste may take place. For this purpose the bin may be fitted with a magnetic band 162 for the removal of ferrous materials. The magnetic band moves the waste upwardly towards shredder rolls 164 which reduce the waste particle size to facilitate the further handling thereof. Ferrous materials separated from the waste by the magnetic band may be dropped onto a conveyor 166 disposed in the bin for the removal of a suitable collection point.

Normally, the solid waste issuing from shredders 164 is discharged into the incoming used water channel 108 to entrain the waste in the water so that it flows with the water to settling basin 110. The size reduction of the waste by the shredders facilitates the entrainment of the waste in the water flow and its subsequently removal therefrom by screen 112 and conveyor 132.

The relatively slow flow of the water through the basin 110 facilitates the settling of materials, ordinarily inorganic materials which have a specific gravity greater than one. Inorganic matter which settles out in the basin is collected at the bottom thereof and removed from the basin with a bucket conveyor 168 or the like. To facilitate the separation of inorganic matter from the water flow, a series of air jets 170 may be mounted to the bottom of the basin at the upstream end thereof to thoroughly mix the water and the entrained materials and to facilitate the separation of the heavier inorganic materials from the lighter organic materials. Additionally, various aids to facilitate the separation of the organic and inorganic matter and the collection of the organic matter for removal from the water flow may be provided is more fully described hereinafter.

Organic matter removed from the water flow by conveyor 132 is transported to a pair of laterally spaced apart solid waste dispensing chambers 172 of furnace 104. The solid waste may be continuously transported via endless conveyor belts 174 or by placing the waste from conveyor 132 in receptacles (not separately shown in FIG. 2) which, in turn, are transported to the dispensing chambers. Preferably, the solid waste is predried to the largest extent possible before it is placed in the dispensing chambers. This can be accomplished, for example, by passing available hot exhaust gas over the wet waste.

In instances in which the solid waste received in bin 160 contains little or now inorganic matter, its entrainment in the used water flow can be eliminated. Instead, the solid waste is directly conveyed to the dispensing chambers 172 via the conveyor 174 by closing a trap door 176 downstream of shredders 164 which diverts the solid waste from the used water flow towards the conveyor.

The furnace 104 is defined by at least two and preferably by three substantially cylindrical, horizontally oriented and parallel drums which are rotatable about their respective axes. The drum axes are triangularly spaced apart so as to define a pair of lower drums and an upper drum disposed above and between the lower drums. Each drum has a suitable drive and at least one closable opening for the intake and discharge of materials as is further described below. The lower drums 178 are utilized for the incineration of solid waste placed into dispensing chambers 172. At intermittent intervals the rotation of the drums is arrested and suitable trap doors (not separately shown in FIG. 2) are opened to load the drums with fresh solid waste. Thereafter the doors are closed and rotation of the drums commences while the drums are initially exteriorly heated via gas burners or hot gas outlets 180 to bring the interior of the drums to the desired incineration temperature of between 500°–800° C. The oxygen supply to the interior of the drum is controlled to prevent a complete incineration of the furnace. Instead, the incineration is limited to that necessary to generate sufficient heat to sustain the incineration process and heat the upper drum sufficiently to sustain the pyrolyzation of filter sludge therein. Due to the oxygen deficiency the solid waste is degassed and a combustible gas is generated from it, leaving as an end product ash with trace amounts of combustible materials, heavy metals residue and the like. The ash is discharged in a downward direction to an ash receptacle 182 while the drum rotation is arrested. During the incineration process combustible gas is withdrawn from the drum interior into gas lines 184. Ash is periodically discharged from receptacle 182 and transported to a suitable disposal site.

The upper or pyrolyzation drum 186 normally serves to regenerate saturated filter coal and to pyrolyze sludge adhering thereby to thereby generate additional filter coal. The drum has at least one closable opening and it is disposed beneath a saturated coal storage bin 188 which receives sludge saturated coal placed into coal chutes 152. As with the lower drum, the rotation of the upper drum is intermittently interrupted to permit the restocking of the drum with saturated coal and to permit the discharge of regenerated filter coal. After the upper drum has been stocked with saturated coal, it is rotated and heated with heat energy derived from the incineration process that takes place in the lower drums 178. Heating is accomplished by a heated gas convection flow within a closed interior chamber 190 of the furnace which houses the drums as well as by direct heat radiation between the lower and the upper drums.

The interior of the upper drum is normally maintained substantially oxygen-free so that no combustion of either coal or organic matter adhering thereto takes place. Instead, both are initially dried and thereafter the organic matter is pyrolyzed, that is, it is degassed generating a combustible gas and leaving as a reusable residue normal, e.g. non-activated coal or carbon. After the pyrolysis in the upper drum has been completed the regenerated filter coal is withdrawn and can be reused in the filter elements.

The combustible gas generated in the upper drum is combined with the gas withdrawn from the lower drums. It is relatively rich on combustible materials and normally includes substantial amounts of long chain hydrocarbons which do not lend themselves for use in combustion engines. The gas is therefore directed into a cracking unit 192 where the hydrocarbons are broken down into the more desirable short chain hydrocarbons. The construction of the cracking unit is further described below.

From the cracking unit the gas may be cooled in a heat exchanger 194 to reduce its temperature and recover heat energy for further use. The gas is then passed into a scrubber 196 to remove particulate liquid and/or solid contaminants from it. The scrubber can be operated with usable water withdrawn from the usable water outlet 118 via a water conduit 198. In the scrubber the gas is conventionally cleaned and the water is returned from the scrubber to the used water intake via a return conduit 200. In the alternative used, incoming water may be employed for scrubbing the gas withdrawn from drums 178, 186.

The new cleaned gas may be utilized in a gas driven internal or external combustion engine 202 which in turn drives an electric generator 204, for example. For particular applications the engine may, of course, drive other appliances such as a pump for example. Alternatively, the gas may be used to heat furnaces, boilers or the like.

As a further alternative to utilizing the gas it may be piped away from the waste disposal plant 102 for sale and use at a remote location or the gas may be conventionally liquefied in a hydrocarbon gas liquefication plant 206 for storage, shipment sale, and/or segregation into liquid nitrogen and a liquefied methane base gas.

The relatively hot exhaust gas from combustion engine 202 is not immediately discharged into the atmosphere to prevent the loss of the heat energy contained therein. Instead it is directed through a heat exchanger 208 for heating a suitable heat exchange medium, e.g. water, which is further utilized as discussed below. To the extent necessary, exhaust gas from the combustion engine is also flowed via an exhaust gas conduit 210 for discharge through nozzles 180 into furnace chamber 190 to provide additional heat to facilitate the incineration of solid waste and the pyrolyzation of filter sludge. Gas not required in the furnace and the exhaust gas withdrawn from the furnace is next cooled by directing it through another heat exchanger 212 and/or through a solid waste predryer 214 through which conveyor 174 passes the solid waste before its discharge into the solid waste dispensing chamber 172.

To further treat and cool the exhaust gas before its discharge to the atmosphere, it is preferably passed through and over the sludge saturated filter coal and/or filter elements in a coal predryer 216 positioned so that sludge saturated coal that is being returned to furnace 104 for regeneration is contacted by the exhaust gas. This not only partially or completely dries the coal but additionally filters the exhaust gas and removes therefrom any particulate matter that may be carried by it. Additional heat energy that may be present in the exhaust gas after it has passed the saturated filter coal may be removed by a suitably positioned heat exchanger (not separately shown) for subsequent utilization. The exhaust gas can then be discharged into the atmosphere, comprising no more than ecologically harmless steam, inert gases, and very little heat energy.

The heat energy collected by heat exchangers 156, 194, 208, 212, and/or 216 is combined by flowing the heat exchange medium, e.g. water through heat collector pipes 218 to a heat, e.g. hot water collector 220. From the collector the hot water may be suitably used for heating the coils 138 of backwash water reservoir 136, for example, for heating buildings, as a hot water supply for manufacturing operations or the like economically utilize the heat energy liberated during the treatment and disposal of liquid and solid waste to the greatest possible extent so as to enhance the profitability of the treatment plant.

From the foregoing description of the waste disposal and treatment plant of the present invention, its profitable operation in an ecologically safe manner should be apparent. Aside therefrom, however, it has some inherent flexibilities which are rarely encountered in prior art treatment plants, particularly insofar as the treatment of used water is concerned. For example, the contamination of used water, particularly, by toxic substances from industrial or agricultural concerns frequently undergoes wide variations with sudden surges in the toxidity level due to opening of a valve in an industrial plant, for example. Prior art clarification plants which heavily rely on biologically activated zones cannot effectively handle such surges because they immediately result in a serious damage to and sometimes the destruction of the micro-organisms which effect the preclarification of the used water. The damage and/or destruction of the micro-organisms, however, neutralizes their effectiveness and the result of such a surge in the toxidity level may be a collapse of the whole clarification process.

No such problems are encountered with the present invention which does not rely on biologically active zones to effect the cleansing of the used water. Instead, all contaminants in the water are removed in the coal filers. If there is a sudden surge of contaminants it simply results in a quicker saturation of the filters. This requires a more frequent replacement and regeneration of the filters which is readily, simply and substantially without additional costs performed. Thus, when high contamination levels are encountered the frequency with which the filters are replaced is increased. When the contamination level drops the frequency is decreased. Accordingly, the filters are utilized in their most effective manner and the discharge from the plant of clear, usable water at all times is thereby assured.

Referring now to FIGS. 4 and 5, the construction of furnace 104 is described a greater detail. The lower and upper drums 178, 186 are disposed within a generally closed housing 222 which defines the interior furnace chamber 190. The drums are horizontaly oriented, paralllel to each other and their respective axes are triangularly spaced as above described. Shafts 224 are journaled in bearings 226 mounted to the housings and permit the rotation of the drums about their axes. A drive unit 228 which include a suitable motor 230 and gearing is provided to rotate the drums. Each drive unit is preferably independent of the others so that each drum may be independently rotated or arrested. Each drum further includes an access opening 232 for filling and emptying it. A pair of oppositely hinged hatch doors 234, 236 is provided to close each of the access openings and they are hingeable in an outward direction relative to the drum. The drive units include means for arresting the rotation and indexing each drum so that the respective access openings 232 are either in an uppermost position (as shown in FIG. 4) or in a downward position for receiving fresh material or for discharging the contents of the drum, respectively. When the hatch doors are open (not shown in the drawing) they define a funnel-like guide to assure that materials received from above are guided into the drums and not spilled into the furnace chamber 190.

Drum shafts 224 of the lower drums are hollow to define an air intake 238 (lefthand shaft as seen in FIG. 5) and a combustible gas outlet 240 (righthand shaft as seen in FIG. 5). To prevent an accidental spillage of solids in the drum into the hollow shafts convex screens 242 are placed over the air intake and gas outlet and they are secured to end plates of the drums. Since the upper drum does not require air for the pyrolyzation of filter sludge it normally includes a gas outlet 242 while the other shaft is solid.

The air intakes 238 can be regulated with air valves 244 while the combustible gas outlets 240 preferably include one-way check valves 246 which permit the withdrawal of gas from the drum but which prevent a backflow of gas into the drum. Combustible gas withdrawn from drums 178, 186 is flowed through gas line 184 to cracking unit 192, scrubber 196 and combustion engine 202 for driving a generator 204 or the like in the above-described manner. Gas line 184 has a branch line 248 that is closable and can be regulated with a valve 250 so that combustible gas can be returned to the furnace chamber 190 in the event additional external heat is required in the furnace chamber.

Disposed immediately above each lower drum 178 is a solid waste storage and release receptacle 252 which is downwardly closed by a horizontally slidable closure plate 54. Receptacle 252 in turn communicates with solid waste dispensing chamber 172 (shown in FIG. 1) or it may form an integral part thereof. In the former case, the receptacle can be employed as a metering device for filling the drum with solid waste to be incinerated.

Beneath the horizontal closure plate is a cavity 256 which is downwardly closed with a hinged plate 258 that preferably carries thermal insulation 260 to prevent significant heat losses from furnace chamber 190 into the cavity and the solid waste receptacle. When the lower drum is to be loaded with fresh solid waste the hinged plate is first opened by pivoting it about a horizontal hinge (not separately shown) so that the plate extends into cavity 256. Next, hatch doors 234, 236 of the drum are opened by hinging them about horizontal hatch door hinges 262, which are parallel to the axis of the drum, until the hatch doors contact the walls of cavity 256. Thereupon the horizontal closure plate 254 is slidably opened so that the contents of solid waste receptacle 252 can drop through the cavity into the interior of the associated lower drum. Thereafter, all doors are closed again and the solid waste in the drum is ready for incineration.

Upper drum 186 has a similar arrangement for filling it with saturated filter coil to be regenerated. Briefly, a downwardly open cavity 264 is closed with a horizontally hinged plate 266 while another horizontal closure plate 268 separates the cavity from coal storage bin 188. The storage bin may include metering devices (not separately shown) to control the amount of coal that is loaded into the drum. The filling operation for the upper drum is identical to that for the lower drums and correspondingly requires the opening and closing of hatch doors 234, 236, hinged plate 266 and horizontal closure plate 254.

Disposed beneath drums 178, 186 are preferably funnel-shaped hoppers 268, 270, respectively, the upper ends of which are proximate the underside of the associated drums. Heat exchanger coils 272 may be applied to the exterior of the hoppers, or they may be built into their walls (not separately shown in the drawings) for withdrawing from hot ash or coal, respectively, available heat energy which may then be transported to the heat collector 218 shown in FIG. 2.

In accordance with one embodiment of the invention the lower end of ash hoppers 268 may be directly tied into the ash receptacle 182 shown in FIG. 2. Alternatively, the lower ends may be provided with a suitably constructed damper 274 so that ash discharged into the hopper can be temporarily stored therein. By opening the damper the ash may be discharged into individual transport containers (not shown in FIGS. 4 and 5) or onto a transport belt 276 for removal to an ash disposal site.

Similarly, coal hopper 270 may be directly tied into the coal discharge chute 154 shown in FIG. 2 for distribution of regenerated coal into filter elements. Alternatively, the lower end of the coal hopper may likewise be fitted with a damper 274 for the intermittent release of regenerated coal into suitable containers or filter elements disposed immediately beneath the collector (not shown in FIG. 4) or for its release onto a transport belt 276 for transportation of the coal away from the hopper.

Still referring primarily to FIGS. 4 and 5, furnace housing 222 also includes an air intake 278 that is regulated by a valve 280. The upper portion of the housing further defines one or more gas discharge conduits 282 which are controlled with valves 284 and which are connected with an exhaust conduit 286 (shown in FIG. 2) that leads to the solid waste predryer 214, the coal predryer 216 and thence to the atmosphere in the earlier discussed manner. The location of the gas discharge conduits 282 at the upper portion of the furnace housing facilitates the heat convection gas flow from the lower drums, where the partial incineration of solid waste releases heat to correspondingly heat the upper drum and the coal and filter sludge disposed therein for the pyrolyzation of the latter. The air intake 278 can be used to control, e.g. lower the temperature in the furnace chamber 190 should that be necessary due to an excessive incineration of solid waste, for example. It may further be used to provide the necessary oxygen for burning combustible gas that is fed into the furnace chamber via branchline 248. Under normal, constant operations, however, the air intake will usually be closed.

The operation of furnace 104 to regenerate sludge saturated filter coal, incinerate solid waste into ash and generate a combustible gas, can now be summarized. Initially the lower drums are filled to the desired level with solid waste and the upper drum is filled to the desired level with saturated filter coal. Next, all drums and their contents must be brought to their operating temperature, e.g. about 500°–800° C. This is best done by intially injecting a combustible gas into the furnace chamber 190 via gas branchline 248 and by providing the required combustion oxygen via air intake line 278. Alternatively, to the extent available, hot, e.g. exhaust gas may be injected into the furnace chamber without further combustion, provided such gas is available at the site. During the heat up period, the drums are rotated to assure a thorough mixing of their contents and an even heatup thereof.

Once the necessary (but relatively low) average solid waste incineration temperature of between 500°–800° C. has been reached the external heating of the drums via branchline 248 and air intake 278 is discontinued and combustion air is flowed into the lower drums 178 via air intakes 238. The air volume is controlled so as to minimize the incineration which takes place inside the lower drum to that required for maintaining the desired temperature, which means that the process takes place under an oxygen deficiency. The solid organic waste in the lower drums is consequently degassed to generate a combustible gas (which includes steam to the extent moisture is present in the solid waste in the drums). The combustible gas is withdrawn from the lower drums via check valve 246 into gas line 184. While the solid waste in the lower drums is degassed partially incinerated heat is released which heats both the contents and the exterior of the drum, thereby heating the furnace chamber 190 and gas surrounding the lower drums. As the gas heats up it rises by convection and in turn heats the upper drum 186. Additional heating of the upper drum is accomplished through radiation. It will be noted that furnace housing 222 is constructed so that all heated gas is forced into intimate contact with the upper drum to assure an efficient heat transfer. This may further be enhanced by undulating the exterior of the upper drum (not shown in the drawings) or by providing heat transfer conduits 288 which extend at spaced intervals across the interior of the upper drum and through which hot gas in the furnace chamber can pass.

The heat energy from the lower drums is ultimately transferred to the filter coal and filter sludge in upper drum 186 and raises the temperature thereof to the desired carbonization temperature. Since the interior of the upper drum is maintained substantially oxygen-free, no appreciable incineration of either filter coal or filter sludge takes place. Instead, the coal and sludge are dried, giving off steam, and the sludge is slowly degassed and carbonized, giving off a combustible gas that is withdrawn via gas outlet 240 to gas line 184 for further utilization. The carbonization process in the upper drum is aided by the continuous thorough mixing of its contents by virtue of the rotation of the drum.

At this point, the solid waste incineration and filter coal/sludge regeneration is in equilibrium and self-sustaining, burning just enough solid waste to maintain the desired temperature to effect the degassing of the remaining solid waste and the carbonization of the filter sludge in the upper drum. If heat losses within the furnace 104 should exceed the heat energy generated therein, combustible gas withdrawn from the drums can be intermittently rerouted into the chamber via branchline 248 to maintain the temperatures at the desired level.

The process is completed and terminated when the content of the lower drums 278 is primarily ash, although some incompletely burnt organic substances which can no longer be efficiently incinerated may remain in the ash. Further, the process is complete when all organic filter sludge that was loaded into the upper drum 186 with the filter coal has been carbonized. At that point, the rotation of the drums is halted, they are indexed so that their access openings face downwardly and the respective hatch doors 234, 236 are opened to discharge the ash and coal or carbon, respectively, into hoppers 268, 270 for disposal or further use.

Referring now to FIGS. 1-3, the production, regeneration, activation and circulation of coal and activated coal within the waste treatment and disposal plant 102 of the present invention is briefly summarized. Coal of varying particle size is generated in upper drum 186 of furnace 104 and intermittently discharged therefrom. The coal is classified according to size on a screen 290, which may be combined with conveyor 276 (shown in FIGS. 4 and 5) or be separate thereof. Larger, nonactivated coal particles may be directly used in roughing filter 114 by placing such particles in filter elements 120 and inserting them in the roughing filter in the above-described manner. The sludge saturated roughing filter coal is intermittently returned to furnace 104 for regeneration in upper drum 186. The coal is normally predried as already described and dumped from the filter elements into coal storage bin 188 of the furnace. The sludge adhering to the saturated filter coal is carbonized in the drum and thus increases the amount of available filter coal. This wholly or partially offsets any coal losses experienced in the filter, in the drum or during the transport of the coal between the two. If excessive coal losses are experienced, metered quantities of organic solid waste may be added to the coal and sludge placed into upper drum 186 as is schematically illustrated in FIG. 3.

Fine coal particles, and/or coal dust drop through screen 290 and, depending on the coal requirements at the particular time within the plant, they are alternatively placed into a coal pelletizer 292 for pelletization into larger filter coal particles or routed to a coal activator 294 for generating activated coal or carbon from the fine particles and/or dust in a well-known manner. Pellets formed in pelletizer 292 are recombined with the regenerated, larger coal particles separated from the dust by screen 290, are placed in roughing filter elements 120 and returned to roughing filter 114.

Activated coal from activator 294 may be routed through an activated coal pelletizer 296 to give the activated coal the desired particle size and it is then placed in fine filter elements 126 for placement in fine filter 116. Activated coal saturated with sludge in the fine filter is periodically removed therefrom as already described, is preferably backwashed in backwash compartment 134, and thereafter is recirculated through the fine filter. Any activated coal losses are compensated with fresh activated coal received from activator 294 and pelletizer 296.

If backwashing of a given fine filter element is no longer feasible or practical, the saturated activated carbon may be recirculated into upper furnace drum 186 for regeneration (requiring subsequent reactivation of the coal if activated coal is desired). Alternatively, it may be routed into lower drums 172 for complete incineration and the generation of heat energy for use as described elsewhere.

During periods of particularly heavy activated coal demand or for the commercial production of activated coal regenerated, large particle size coal from upper drum 186 may be routed through a coal grinder 295 and then fed to coal activator 294.

From the preceding paragraphs it is apparent that the waste treatment and disposal plant 102 of the present invention is capable of fully supplying its normal coal and activated coal requirements to effect the desired clarification and treatment of used water to yield non-polluting, usable water. The rate of coal production, regeneration and activation can be adjusted according to the demands of the plant. Furthermore, additional coal and activated coal can be produced for sale to generate additional income from the waste treatment and disposal process.

Referring now to FIGS. 2 and 6, the construction and operation of cracking unit 192 is described in detail. In the preferred embodiment, the cracking unit is defined by an upright, double-walled vessel 298 in which an inner vessel 300 is suspended from a top 302 of an outer, supporting vessel 304. The inner vessel has an open upper end 306 over which an openable closure plate 308 is placed to provide access to the interior of the inner vessel. A lower end of the inner vessel is restricted inwardly to define a reduced diameter throat 310 which carries a screen 312. From the reduced diameter throat, the inner vessel tapers outwardly and terminates some distance above a bottom 314 of the outer vessel and a further screen 316 disposed between the bottom and the lower end of the vessel.

A generally circular air supply line 318 surrounds the exterior of the reduced diameter throat 310 is in fluid communication with an air or oxygen supply, and includes a plurality of air nozzles 320 which are mounted for blowing combustion air or oxygen into the interior of inner vessel 300 immediately above screen 312. Combustible exhaust gas line 184 extends into an upper portion of the interior of inner vessel 300 and terminates in a downwardly facing gas discharge head 322.

In operation, the interior of the inner vessel 300 is filled with relatively large pieces of a combustible material such as wood, coal or coal that has been regenerated as above-described (hereinafter collectively "wood") so that the wood fills the major portion of the space between screen 312 and the gas discharge head 322. The wood immediately above the screen is ignited and combustion oxygen is supplied via air nozzles 320 so as to create a high temperature zone which extends a relatively short distance upwardly of the screen while the remaining wood in the inner vessel remains relatively cool. After the wood in the high temperature zone has reached the desired temperature combustible gas is introduced into the cracking unit via gas line 184 and head 322. Furthermore, a blower 324 is energized to form a slight vacuum in the outer vessel 304 to draw gas discharged by head 322 downwardly past the cool wood, the high temperature zone, into an annular space 326 between the vessels and hence out of the vessel and via a suction line 328 to the blower.

Thus, gas discharged by head 322 initially filters down over and around the relatively cool wood pieces, causing it to deposit on the wood both liquid and solid particulate matter carried in the gas such as dust, coal particles, heavy oil and tar droplets, etc. In the high temperature zone the gas is heated to a temperature in the vicinity of 1300° C. The amount of oxygen supplied through air nozzles is metered so as to maintain the desired temperature but prevent any significant combustion of gas. Instead, the desired temperature in the high temperature zone is maintained by slowly combusting, glowing wood and by liquid and solid particles previously filtered out of the gas by the wood.

The high temperature causes the cracking or reduction of long chain hydrocarbon molecules into relatively short chain hydrocarbons, yielding a methane base gas that exits from the lower end of the inner vessel. This methane base gas is ideally suited for direct use in internal or external combustion engines or for subsequent liquefication, storage and/or shipment.

From the blower, the gas is alternatively directed to combustion engine 202 or to the gas liquefication plant 206. While in the liquefication plant, the incoming gas is cooled to the desired temperature. This leads to the generation of substantial amounts of liquid nitrogen, both from nitrogen derived from the combustion air initially applied to lower drums 178 of furnace 104 and from combustion air applied to cracking unit 192 via air nozzles 320. This liquid nitrogen is readily separated from the liquefied methane base gas and can be independently sold for appropriate uses, thereby yielding a further profit item as a by-product of the waste disposal and treatment plant of the present invention.

From a practical point of view, for each 100 kg of solid waste incinerated in the lower drums 178, the cracking unit discharges a gas volume (combustible gas, minor amounts of oxygen and air nitrogen) of approximately 180 kg. Moreover, the cracking unit consumes an average of about 6 kg of wood for each 100 kg of solid waste incinerated in the lower drums of furnace 104. In the overall operation of the plant, and with the operation of the cracking unit as above-described, approximately 80% of the energy available in the liquid and solid waste treated and processed in the plant is recoverable from the cracked exhaust gas. If the gas is liquefied, providing the recovery of liquid nitrogen, approximately 50% of said available energy is recuperable from the liquefied methane base gas.

It is, of course, apparent that wood must be periodically added to the cracking unit by correspondingly opening cover 308 and placing the wood inside the inner vessel 300. Alternatively, suitable means for a continuous resupply of wood (not separately shown) may be provided.

Referring now briefly to FIGS. 2 and 7, an alternative coal filter construction is shown and described. Instead of placing filter coal into individual containers as previously discussed an endless bucket-type conveyor-filter 330 may be placed into the flow of usable water at the appropriate locations. The bucket filter generally comprises a pair of laterally spaced conveyor chains 332 or the like which are driven over a pair of spaced apart pulleys 334 so that the upper strand 336 of the chains moves in an upward direction, to the left as seen in FIG. 7.

Multiple buckets 338 are mounted in a serial fashion between the conveyor chain strands. Each bucket has a generally square or rectangular, solid base 340 from which a pair of generally triangular side walls 342 project upwardly. The aft end of the side walls, that is the righthand end as seen in FIG. 7, is connected with a rearwardly and downwardly facing, upright screen 344 which has a mesh size that is sufficiently small so as to retain in the bucket filter coal particles placed therein. The buckets are suitably hinged to the conveyor chains and a plurality of support rollers 346 are provided on the chains so as to guide them along a normally straight, upwardly inclined path.

In operation, the bucket filter 330 of the present invention is installed at the appropriate location in the used water flow downstream of settlement basin 110 so that water flows, e.g. spills onto the uppermost bucket of the conveyor. The conveyor is driven at a predetermined speed so that the buckets attached to upper chain strands 336 move upwardly and to the left, as seen in FIG. 7 and fresh filter coal is added to each lowermost bucket of the conveyor as is illustrated in FIG. 7.

Used water spilled onto the uppermost bucket flows downwardly through the filter coal in each bucket and the associated screen 344 onto the next lower bucket until fully filtered water exits from the lowermost bucket. It will be noted that the coal in the filter buckets is moved in a counterflow direction to the used water flow so that the cleanest coal filters the water last, while the most contaminated coal filters the water first.

Saturated filter coal is dumped from the buckets as they swing about the upper pulley 334 and is then transported in the earlier discussed manner to the upper furnace drum 186 for regeneration, to the lower drums for incineration, or it is suitably backwashed for reuse.

Referring to FIG. 8, a somewhat modified construction and operation of the waste treatment and disposal plant of the present invention is shown. A reactor 1 generates a combustible carbonization gas from organic substances, forms non-activated and activated carbon, and regenerates the latter along the lines previously discussed. Combustible, e.g. organic solid trash floating on a water-trash mixture can be removed therefrom at outlet 16. It is placed into containers (such as filter containers 8) which are then transported to rotary combustion drums 4. During the transport dehydration zones or beds can be provided to remove excess water from the trash. The combustible substances are further dried with heat generated by reactor 1 in chambers 2 and 3 located above the reactor. Waste products applied to drums 4 are partially combusted and carbonized by correspondingly limiting the quantity of air that is fed to the reactor. The incomplete combustion of the substances under an oxygen deficiency forms a combustible carbonization gas. After the gas has passed a scrubber it is transported to gas motors or turbines coupled to electric generators for producing electric energy as discussed in greater detail above.

For the production of activated carbon and non-activated carbon a predetermined mixture of organic substances is applied to a third rotary drum 5 of reactor 1. The mixture, a mash, is also predried in dehydration chambers 2a and 3a shown in FIG. 8.

The carbon or activated carbon produced in drum 5 is discharged via a suitable chute into a filter container 8 positioned at station 32. The just filled container is transported via a gravity conveyor 9 to station 10 from where it can be lowered into filter zone 23 of the clarification plant. A freshly lowered filter container 8 is illustrated at the downstreammost position (righthand side) of the filter zone. Waste water to be filtered flows to the right, as seen in FIG. 8, in a downstream direction through the filter zone.

A suitable hoist 11 intermittently advances each filter container in opposition to the water flow, that is in a counterflow direction (to the left as shown in FIG. 8) to an upstreammost position adjacent a vertical hoist 24. With increasing contamination of the filter carbon in the container the latter is thus exposed to increasingly contaminated water as it moves to successively more upstream positions of the filter.

To subject the carbon filter containers to opposite water flow-through directions as they are moved to successively more upstream positions water filter zone 23 includes baffle walls 25, 26 which permit water to alternatingly pass above and below, respectively, the baffle walls, so that the water flow direction through the filters is alternatingly upwards and downwards as is illustrated by the arrows 20. It will be observed that the water being filtered thus flows successively through a number of serially arranged filters before it is discharged. To increase the capacity of two or more filter container rows can be arranged side by side.

The filter containers have upright sidewalls 8a joined to water pervious end walls 8b. Means such as end flanges 8c is provided which suitably seal against baffle walls 25, 26 or the like to ascertain that no water bypasses a filter container. The containers further include means 8d (shown in the drawing on the containers at locations 19 and 31 only) for attaching them to conveying and hoisting equipment of the clarification plant.

A sand trap 13 precedes filter zone 23. In accordance with the present invention this sand trap simultaneously serves as a means for separating solid waste and as a gas washer or scrubber.

Ordinary domestic and industrial solid waste or trash is dumped into a chute 27. From there the trash passes through a shredder 18 where it is reduced to relatively small particle sizes before it is combined with incoming waste water flowing through inlet conduit 7. The solid waste separator 13, constructed as a sand trap, is especially adapted for removing inorganic substances such as scrap metals, glass, etc. Organic substances suspended in or floating on the water surface are carried with the water towards solid waste outlet 16.

Inorganic substances separated in the area of sand trap 13 are removed therefrom by a suitable conveyor such as a bucket chain conveyor 12.

Exhaust gases from the generator turbine or motor (not shown in FIG. 8) are first recirculated to the interior of reactor 1 to utilize heat carried by the exhaust gases in drums 4 and 5. The gases are then withdrawn from the reactor interior via a pipe line 33 to a bell-shaped filter container cover 28. The bell cover closes the upper end wall and seals against flange 8c of the filter container positioned on roll conveyor 19. The container was previously removed from the unstreammost filter position of filter 23 with hoist 24 and it was permitted to stand on conveyor to permit the water to drain from the container. For this purpose, conveyor 19 is above the water-trash mixture flow and constructed to permit water to drain through the conveyor directly into the water flow.

Exhaust gases flowing through pipeline 33 are forced through the container in a downward direction. A suitable bottom cover 14 closes the bottom end wall 8c of the filter container so that exhaust gases that have passed the filter container are withdrawn to an exhaust pipeline 15 and discharged into the waste water running through the solid waste separation zone 34. There the exhaust gases are finish scrubbed and cleansed.

Following the heating and drying with exhaust gas of the carbon in the filter container between top and bottom covers 28, 14 the container is moved to the left, as seen in FIG. 8, to a conveyor system 29 which engages the container and transports it, first vertically and then horizontally to a carbon discharge position 30 where the filter carbon and adhering filtered out materials are dumped from the container. The empty container is returned to a removal station 31 from where the container is transported to the filling station 32 below the rotary drum 5 by gravity conveyor 9. The carbon and activated carbon removed from the container is discharged into rotary drum 5, is there regenerated and is thereafter discharged into the empty container at station 32 designated with the reference numeral 8.

It is apparent that the continuous addition of fresh organic substances from the waste water in the form of an organic residue deposited on the coal or carbon in the filter containers 8 causes the production of excess coal. This excess coal is employed for the production of activated coal in a second reactor (not shown) of the same construction. The activated coal serves as an adsorptive water filter and performs the final filtration of the water in contrast to the system illustrated in FIG. 8 which is considered as a type of preclarification system. A preferred combination of the above-described scrubbing filter with an adsorption filter is described below. It is, of course, possible to supply the second clarification plant with activated coal from reactor 1 illustrated in the drawing provided it has a sufficient capacity.

Referring to FIG. 9 there is schematically illustrated the serial arrangement of the first, roughing filter 23 followed by a second fine filter 35 stocked with activated coal. Both are fitted with the above described removable filter containers (not shown in FIG. 9).

Incoming waste water flows through conduit 39 into the non-activated coal filter bed 23. This filter extracts from the waste water floating and suspended particles through mechanical filtration. The activated coal filter 35 disposed downstream of the non-activated filter 23 is separated therefrom by a wall 36 which defines a passage 37 for water from filter 23 to adsorption filter 35. The passage is disposed adjacent the bottom of the filter 23 so that all incoming waste water must first pass through the roughing filter. Consequently, water received by the adsorption filter includes only a minimum of suspended particles. In the second filter it is finish filtered and thereafter discharged as clarified, unusable water into outlet 38. Because of the minimal amount of floating and suspended particle received by the fine filter, it has an economically advantageous long, uninterrupted service time.

The present invention, therefore, provides for the intermittent circulation of the non-activated and activated filter coal or carbon placed into the two filter zones for filtering the waste water. The coals are intermittently removed, placed in a degassing and regeneration chamber and thereafter returned to the filter zone in their cleansed and activated condition, respectively. This assures an availability of the required coal.

Available coal which is not needed in the filtration process because of the continuous coal supply from carbonized organic substances is used for energy production in carbonization drum 4 and is there ultimately fully incinerated. Accordingly, all heavy metals which are received in the clarification plant from incoming waste are removed therefrom through adsorption in the activated carbon, and are ultimately removed from the system in the ash produced in drums 4.

The scrubbing of the exhaust gas 15 with incoming waste water, in addition to the gas cleansing in the filter containers between covers 14 and 28 results in a maximum cleansing of the exhaust gas before it is discharged. Contaminants which are transferred from the exhaust gas to the surrounding water are removed in filter zone 23 and are thus prevented from being discharged into the environment via the water. They are ultimately recovered as solid waste ash in the ash produced by drums 4.

Filter zone 23 includes a sludge removal system (not separately shown) which connects via a pump with the waste water intake so that sedimentation that forms in zone 23 is recirculated for subsequent removal in that same zone by the filter containers 8.

The present invention is a purely physical waste water clarification system which does not attempt to produce a clarification sludge as an initial separation product as is the case in prior art chemical-biological waste water clarification systems. Quite to the contrary, large particles, suspended materials, and dissolved substances are physically removed from the waste water by a carrier, the filter containers, which function as a transportation medium for filtered out matter by moving it with the containers to a degassing chamber. There the organic substances are degassed so that no independent separation product such as clarification sludge is formed.

Through the continuous resupply of organic substances, received through their entrapment in the filter zone, the available coal volume is continuously increased. In the event that the received volume is insufficient additional filter coal can be produced by applying part of the incoming solid waste to the upper, carbonization drum 5 of reactor 1.

Referring to FIGS. 10 and 11, another construction of the portion of a clarification plant at which incoming solid waste and waste water are combined and classified is illustrated. Generally speaking, incoming waste water in a supply conduit 40 is directed into a mixing zone 41 for combination with suitably prepared solid waste. The mixture then flows into a sedimentation zone 42 where it is decelerated and thereafter into a filter zone (not shown in FIGS. 10 and 11).

A solid waste receptacle 43 is positioned immediately above the water intake and receives general domestic and/or industrial, organic substance containing waste or trash. The waste is entrained through a chute 46 into the incoming waste water stream in the mixing zone 41. A rotary mixer 44 or the like, preferably positioned adjacent the bottom of the mixing zone, induces a counterflow in the solid waste-used water to achieve a thorough mixture of solid waste and water. Air jets 45 positioned at the floor of the mixing zone discharge pressurized air to increase the solid waste-used water mixture and to enrich the water with oxygen. Magnetic bands 47 and/or submerged electromagnets (not separately shown) are positioned downstream of the mixing zone and serve to remove from the mixture ferrous metals. In the alternative, a magnetic band can be positioned in the immediate area of the solid waste intake chute 46 or directly within the solid waste receptacle 43 as was previously described.

Downstream of the mixing zone and the ferrous metal removal magnets is the sedimentation zone 42 in which floating or suspended organic substances are separated from the sinking inorganic materials, that is non-floatable or non-suspendable materials having a specific gravity larger than that of water. Solid waste floating to the surface of the water flow in the sedimentation zone, such as paper, wood products, tires, plastics, etc. is directed to a solid waste disintegrator and/or to the above discussed solid waste removal station (not shown in FIG. 10), or a combination of both, with suitably positioned diverter plates 50. In a preferred embodiment of the invention the solid waste disintegrator comprises a horizontally disposed blade wheel 48 located at the surface of the water-solid waste mixture flow and driven by a motor via a vertically arranged drive shaft. It will be noted that diverter plates 50 constrict the floating trash stream to about the width of blade wheel 48 as is shown in FIG. 11. In the area of the disintegrator, an additional electromagnet can be provided for removing remaining metallic particles.

Inorganic substances, such as glass, sand, ground, metals, etc. settling at the bottom of the sedimentation tank are removed with a suitably constructed conveyor 51.

Thus, the total system produces waste water that only includes relatively small, organic solid waste particles which can be incinerated. The water enriched with such organic materials is fed to a non-activated coal filter 23 (shown in FIG. 11 only) where the roughage and suspended particles added to the water are filtered out to form an organic filter residue for subsequent processing of the residue as above described.

Referring now to FIGS. 12–14, the solid waste-used water mixture that has been pretreated as above described flows through a schematically illustrated suitable intake conduit 52. The intake conduit includes a reservoir 53 that can be closed from the intake conduit with a gate 54. Another gate 55 is provided to close intake conduit 52 to prevent a waterflow into filters 23 and 56 during the backwash operation. With gate 55 in the position closing conduit 52 the reservoir 53 serves as a temporary storage for incoming used water. During normal plant operation gate 55 is open, water is filtered in the non-activated coal filter 23 and the activated coal filter 56 and fully cleansed, usable water is discharged through outlet 62.

A backwash water container 57 is provided with a heating coil 58 for heating the backwash water with available thermal energy from the hot exhaust gases as above described. Backwash water is transported to the activated coal filter 56 via a supply pipe 59. In the filter the backwash water leads to the desorption of particles deposited in the activated coal. Used backwash water leaving the filter is directed to a cooling pool 60 via a pipe 61. After the backwash water in pool 60 has cooled it is returned to the waste water supply conduit 52 at 65 via a suitable flow conduit 63. The conduit is preferably longer than the distance between pool 60 and the point 65 at which the water is returned to incoming used water by snaking the conduit, for example, as is shown in FIG. 12. In addition, the conduit preferably includes cascading sections 66 (see FIGS. 14a and b) which may include paddlewheels 67 or the like to aerate the water and help cool it to the intake water temperature. This is further facilitated by constructing conduit 63 relatively wide so that the water has a large exposed surface or by including turbulence inducing obstacles such as rocks 68 placed in the conduit as is shown in FIG. 14c.

The backwash water is taken from water that has already been filtered, e.g. from outlet 62 via a supply conduit 64 to container 57.

I claim:

1. A process for the combined, energy self-sufficient and substantially pollution free treatment and disposal of solid waste and of sewage comprising the steps of: incinerating a major portion of the solid waste to generate heat energy and ash as a residue; carbonizing at least a portion of at least one of the solid wastes and of particulate, organic contaminants of the sewage to generate filter coal therefrom by heating the portion of the solid waste and of the particulate contaminants; whereby combustible gases, including relatively long chain hydrocarbon molecules are generated during the incinerating and carbonizing steps; converting the relatively long chain hydrocarbons into relatively short chain hydrocarbons by flowing the combustible gases through an oxygen deficient, high temperature zone, having a temperature of at least about 1300° C.; filtering the sewage waste by flowing it through a filter having said filter coal as a filtering material; and discharging from the filter non-polluting, useable water.

2. A process according to claim 1 including the step of generating the high temperature zone by placing combustible objects in an upright container, incinerating the objects adjacent a lower end of the container by injecting a metered amount of oxygen into the container adjacent the lower end thereof, and flowing the combustible gases in a downward direction past the lower end and withdrawing the gases therefrom; whereby the injected oxygen maintains a controlled incineration of the objects and the desired high temperature while the gas passes the objects without significant combustion or oxidation.

3. A process according to claim 2 including the step of placing a sufficient quantity of objects above said lower end so as to maintain some of the objects in the container at a relatively low temperature, and including the step of flowing the combustible gases over the low temperature objects to thereby adhere solid and liquid particles in the gases to the objects for the subsequent combustion of such particles when the associated objects reach the high temperature zone.

4. A process according to claim 1 including the step of cooling the gases withdrawn from the high temperature zone sufficiently so as to liquefy them, and separating the gases into at least liquid nitrogen and a liquid, combustible gas that is substantially free of liquid nitrogen.

5. A process according to claim 1 including the step of directing the gases withdrawn from the high temperature zone to means for combusting the gases, and combusting the gases in said means so as to recover therefrom energy liberated during the combusting step.

6. A process according to claim 5 including the step of withdrawing substantially fully combusted exhaust gases from said means, and including the step of withdrawing from the exhaust gases heat energy and thereafter discharging the exhaust gases to the atmosphere.

7. A process according to claim 6 wherein the step of withdrawing comprises the step of applying at least a portion of the heat energy withdrawn from the exhaust gases to at least one of the steps of incinerating and carbonizing to sustain the incinerating and carbonizing steps.

8. A process according to claim 7 wherein the step of withdrawing comprises the step of flowing the exhaust gas through a heat exchanger and transferring heat energy from the exhaust gases to a heat exchange medium.

9. A process according to claim 7 wherein the step of withdrawing comprises the step of flowing the exhaust gases past at least one of the solid wastes and saturated filter coal prior to the steps of incinerating and carbonizing them, respectively, so as to predry the solid waste and the saturated filter coal.

10. A process according to claim 9 wherein the step of flowing the exhaust gases through a filter comprises the step of flowing the exhaust gases through a coal filter.

11. A process according to claim 7 including the step of flowing the exhaust gases through a filter to remove particulate contaminants therein prior to the discharge of the exhaust gases to the atmosphere.

12. An energy self-sufficient, substantially pollution-free process for the treatment and disposal of solid waste and of sewage comprising the steps of: incinerating some solid waste at a temperature of not substantially more than 800° C. in an oxygen deficient atmosphere to liberate heat energy and to generate a first combustible gas; filtering the sewage in a first, mechanical filter to remove particulate matter therefrom; filtering an effluent from the first filter in a second filter stocked with activated carbon to remove from the sewage remaining suspended and dissolved pollutants; discharging from the second filter substantially pollution-free, usable water; intermittently removing a portion of the first filter carrying a substantial amount of particulate organic matter removed from the sewage and replacing it with a fresh first filter portion; placing the removed first filter portion including the particulate matter adhering thereto in a substantially oxygen-free atmosphere; heating the first filter and the particulate matter in said atmosphere with heat liberated during the incineration of the solid waste to generate coal from the particulate matter adhering to the removed filter portion and a second, combustible gas, and to reconstitute the removed filter portion; reusing the reconstituted filter portion in the first filter; using the generated coal; and employing the first and second combustible gases for the generation of usable energy.

13. A process according to claim 12 including the steps of subjecting at least one of the first and second gases to a sufficient temperature to break relatively long chain hydrocarbon molecules into relatively short chain hydrocarbon molecules, and wherein the step of using the gas for the generation of usable energy comprises the step of flowing the gas after the subjecting step to a combustion motor.

14. A process according to claim 12 wherein the first filter is defined by a plurality of serially arranged filter elements, and including the steps of flowing the sewage serially through the filter elements, advancing the filter elements in a counterflow direction relative to the sewage flow, and periodically withdrawing the filter element disposed at the upstreammost position of the filter for reconstituting such filter and generating coal from particulate organic matter adhering thereto.

15. A process according to claim 14 wherein the step of advancing the filter elements comprises the steps of incrementally advancing the filter elements.

16. A process according to claim 14 wherein the step of advancing the filter elements comprises the step of continuously moving the filter elements at a controlled speed in the counterflow direction.

17. A process according to claim 12 wherein the first filter is stocked with non-activated coal, and wherein the step of using the generated coal comprises the step of placing at least a portion of the generated coal in the first filter to replace coal losses during the filtration process, during the mechanical handling of the filter coal, and during its reconstitution.

18. A process according to claim 12 wherein the steps of reusing the reconstituted filter portion and using the generated coal comprises the steps of segregating from the reconstituted filter portion and from the generated coal, coal of a size smaller than a predetermined size, pelletizing the removed coal into coal pellets having a size at least as large as the predetermined size, and thereafter combining the pelletized coal with the previously segregated coal of at least the predetermined size and placing the combined pelletized coal and coal of the predetermined size in the first filter as a replacement for a removed first filter portion.

19. A process for treating solid and aqueous liquid waste comprising in combination the steps of:
providing at least one upper container, at least one lower container which is proximate but spaced from the container, and a housing enclosing the containers;
providing a first filter and stocking the first filter with non-activated filter coal;
providing a second filter and stocking the second filter with activated filter coal;
flowing the sewage initially through the first filter to remove therefrom particulate matter entrained in the sewage, whereby the particulate matter adheres to the non-activated filter coal and eventually substantially saturates the coal with particular matter;
flowing an effluent from the first filter through the second filter to remove from the effluent any remaining particulate matter and dissolved pollutants through adsorption by the activated filter coal of the second filter;
discharging usable water from the second filter;
placing solid waste into the lower container, and at least initially heating the lower container so that the solid waste therein reaches a temperature capable of maintaining the incineration of solid waste therein;
flowing into the lower container a limited amount of oxygen so as to sustain the incineration process, liberate heat energy, and generate a first combustible gas while heat liberated in the lower container causes a corresponding heating of gas in the housing and thereby heats the upper container;
periodically removing from the first filter, filter coal saturated with particulate matter;
placing saturated first filter coal into the upper container and maintaining the interior of the upper container substantially oxygen-free, whereby heat energy from the lower container heats the saturated first filter coal in the upper container and causes a degassing and a resulting carbonization of organic matter adhering to the first filter coal to thereby reconstitute the first filter coal and generate additional filter coal and a second combustible gas;

removing from the lower container ash formed therein and removing from the upper container reconstituted and additional filter coal;

discarding the ash and placing reconstituted and additional filter coal in the first filter to replenish saturated filter coal removed therefrom;

collecting the first and second combustible gases and heat treating the gases under a substantial exclusion of oxygen to a sufficient temperature so that relatively long chain hydrocarbons are transformed into relatively short chain hydrocarbons; and utilizing energy contained in the heat treated gases before their final disposition.

20. A process according to claim 19 including the step of substantially continuously mixing the solid waste in the lower container and the saturated filter coal in the upper container during the incineration of solid waste in the former and carbonization of organic matter adhering to the first filter coal in the latter.

21. A process according to claim 20 wherein the step of mixing includes the step of rotating the containers about horizontal axes.

22. A process according to claim 19 wherein the step of incinerating the solid waste is performed at an average temperature of the solid waste in the lower drum of not substantially greater than about 800° C. so that heavy metals in the solid waste are prevented from vaporizing and remain as a residue in the ash.

23. A process according to claim 22 including the step of periodically placing activated coal from the second filter in the lower container and incinerating the coal and particulate matter adhering thereto in the second filter, whereby heavy metal residues filtered out in the activated coal filter is incinerated and can be withdrawn from the lower container with the ash.

* * * * *